US011275235B2

(12) United States Patent
Yuki

(10) Patent No.: US 11,275,235 B2
(45) Date of Patent: Mar. 15, 2022

(54) ZOOM LENS AND IMAGE PICKUP APPARATUS

(71) Applicant: CANON KABUSHIKI KAISHA, Tokyo (JP)

(72) Inventor: Akihiko Yuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/880,289

(22) Filed: May 21, 2020

(65) Prior Publication Data

US 2020/0379222 A1 Dec. 3, 2020

(30) Foreign Application Priority Data

May 28, 2019 (JP) .............................. JP2019-099030

(51) Int. Cl.
| | |
|---|---|
| *G02B 15/14* | (2006.01) |
| *H04N 5/225* | (2006.01) |
| *G02B 15/173* | (2006.01) |
| *G02B 15/17* | (2006.01) |

(52) U.S. Cl.
CPC ............... *G02B 15/144109* (2019.08); *G02B 15/145119* (2019.08); *G02B 15/145121* (2019.08); *G02B 15/145125* (2019.08); *G02B 15/17* (2013.01); *G02B 15/173* (2013.01); *H04N 5/2253* (2013.01); *H04N 5/2254* (2013.01)

(58) Field of Classification Search
CPC .... G02B 15/144109; G02B 15/145117; G02B 15/145119; G02B 15/14121; G02B 15/145125

USPC .................................................. 359/679, 688
See application file for complete search history.

(56) References Cited

U.S. PATENT DOCUMENTS

| | | | | |
|---|---|---|---|---|
| 3,614,207 A | * | 10/1971 | Basista | .......... G02B 15/144109 359/688 |
| 9,069,156 B2 | | 6/2015 | Ito et al. | |
| 9,470,878 B2 | | 10/2016 | Yuki | |
| 2012/0314291 A1 | * | 12/2012 | Kogo | ................... G02B 27/646 359/557 |
| 2013/0188155 A1 | * | 7/2013 | Masui | .................... G02B 15/14 353/31 |

(Continued)

FOREIGN PATENT DOCUMENTS

| | | |
|---|---|---|
| JP | 2016173481 A | 9/2016 |
| WO | 2013038614 A1 | 3/2013 |

*Primary Examiner* — Darryl J Collins
(74) *Attorney, Agent, or Firm* — Carter, DeLuca & Farrell LLP

(57) ABSTRACT

Provided is a zoom lens consisting of, in order from an object side to an image side: a positive front lens unit configured not to move for zooming; a plurality of magnification-varying lens units including two magnification-varying lens units having negative refractive powers configured to move for zooming; and a positive rear lens unit configured not to move for zooming, in which a focal length of the front lens unit, a focal length of a magnification-varying lens unit having a negative refractive power and arranged closest to the object side in the plurality of magnification-varying lens units, a focal length of a magnification-varying lens unit having a negative refractive power and arranged closest to the image side in the plurality of magnification-varying lens units, and a focal length of the rear lens unit are suitably set.

10 Claims, 12 Drawing Sheets

(56) References Cited

U.S. PATENT DOCUMENTS

| | | | |
|---|---|---|---|
| 2013/0258130 A1* | 10/2013 | Mihara | G02B 15/1461 348/222.1 |
| 2014/0022438 A1* | 1/2014 | Kuzuhara | G02B 27/646 348/345 |
| 2014/0218808 A1* | 8/2014 | Ogata | G02B 15/173 359/695 |
| 2019/0101727 A1 | 4/2019 | Yuki et al. | |
| 2019/0101732 A1 | 4/2019 | Yuki et al. | |

\* cited by examiner

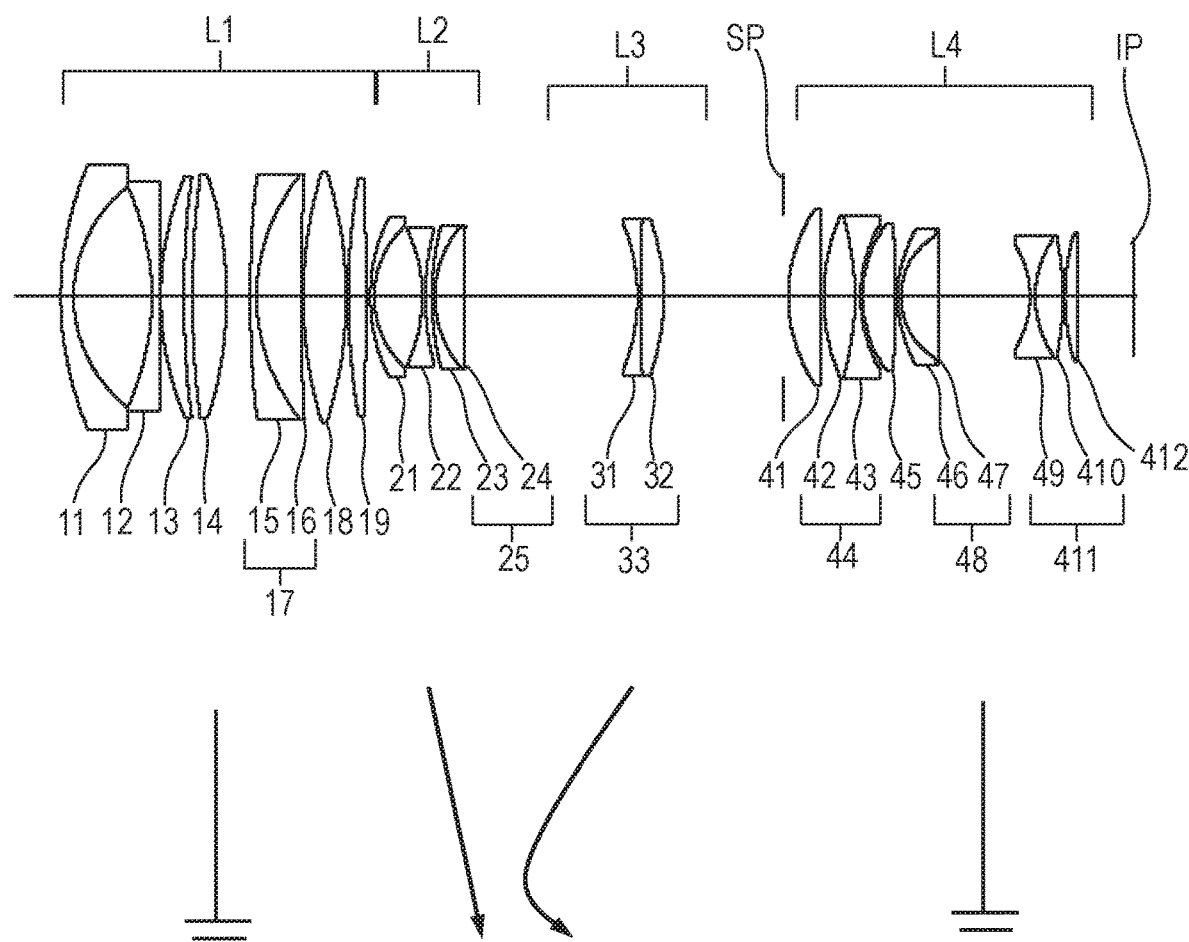

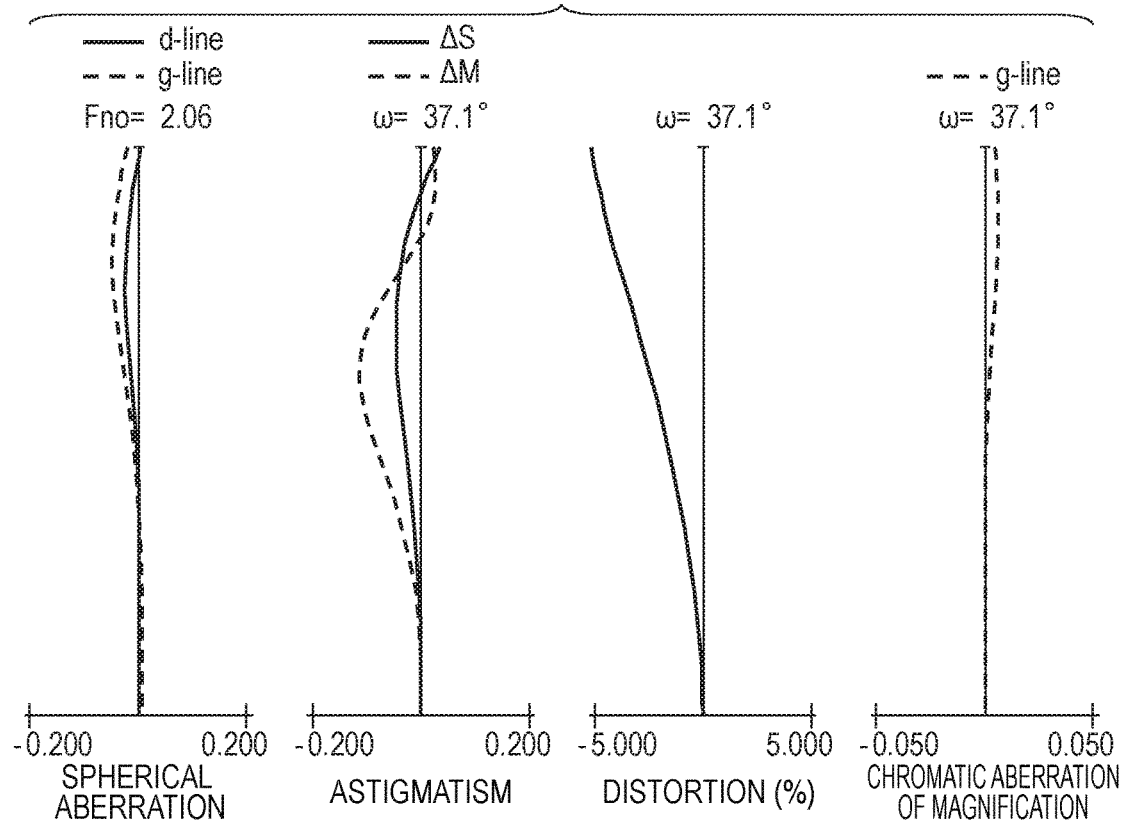
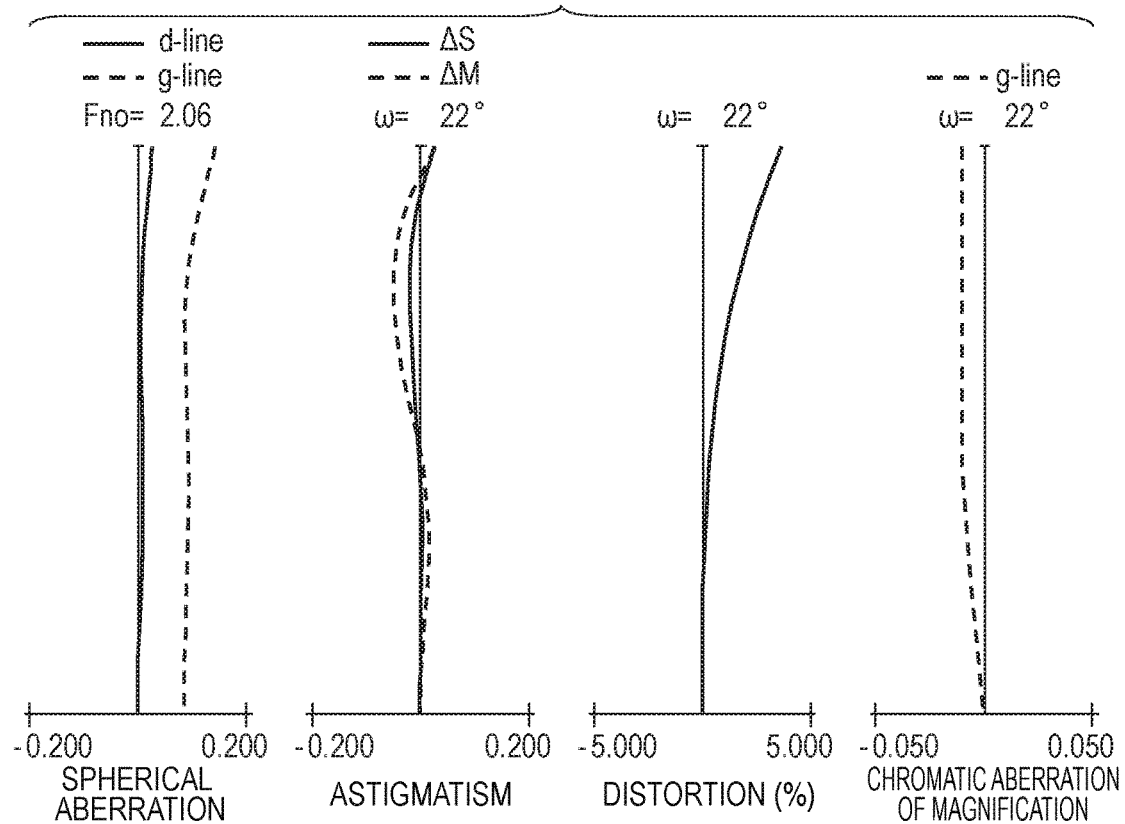

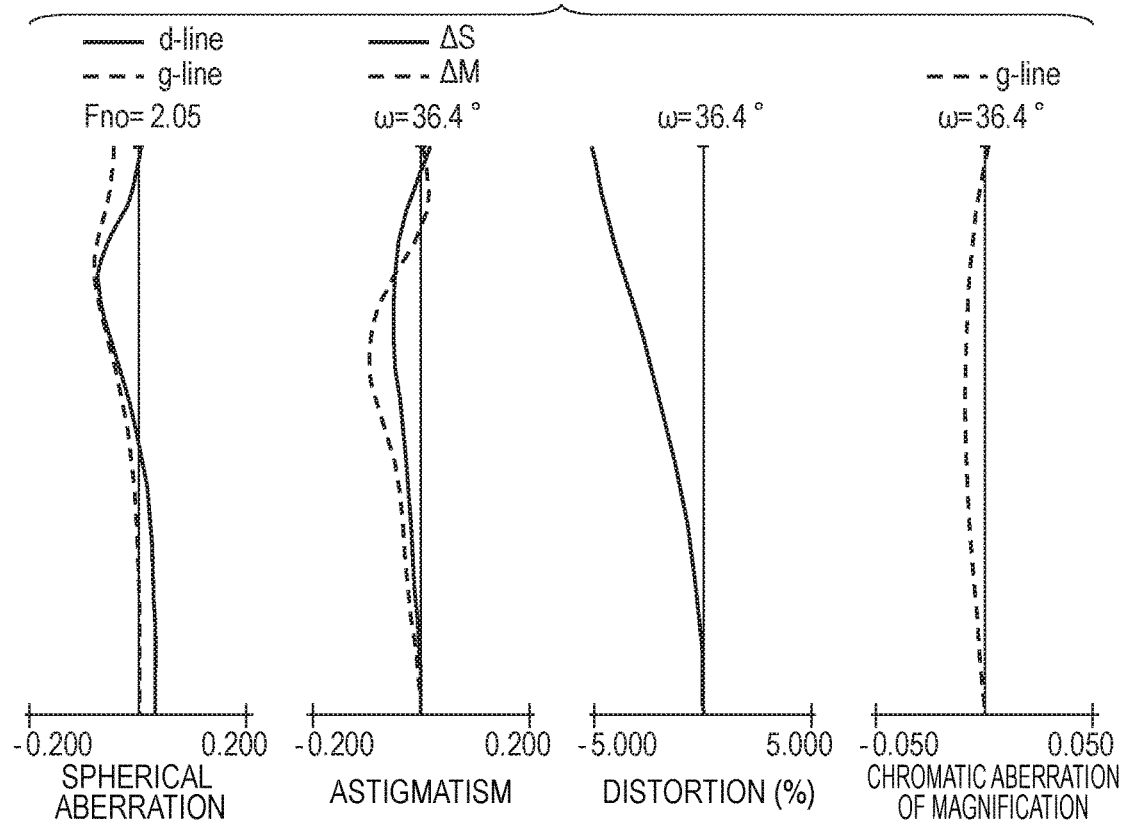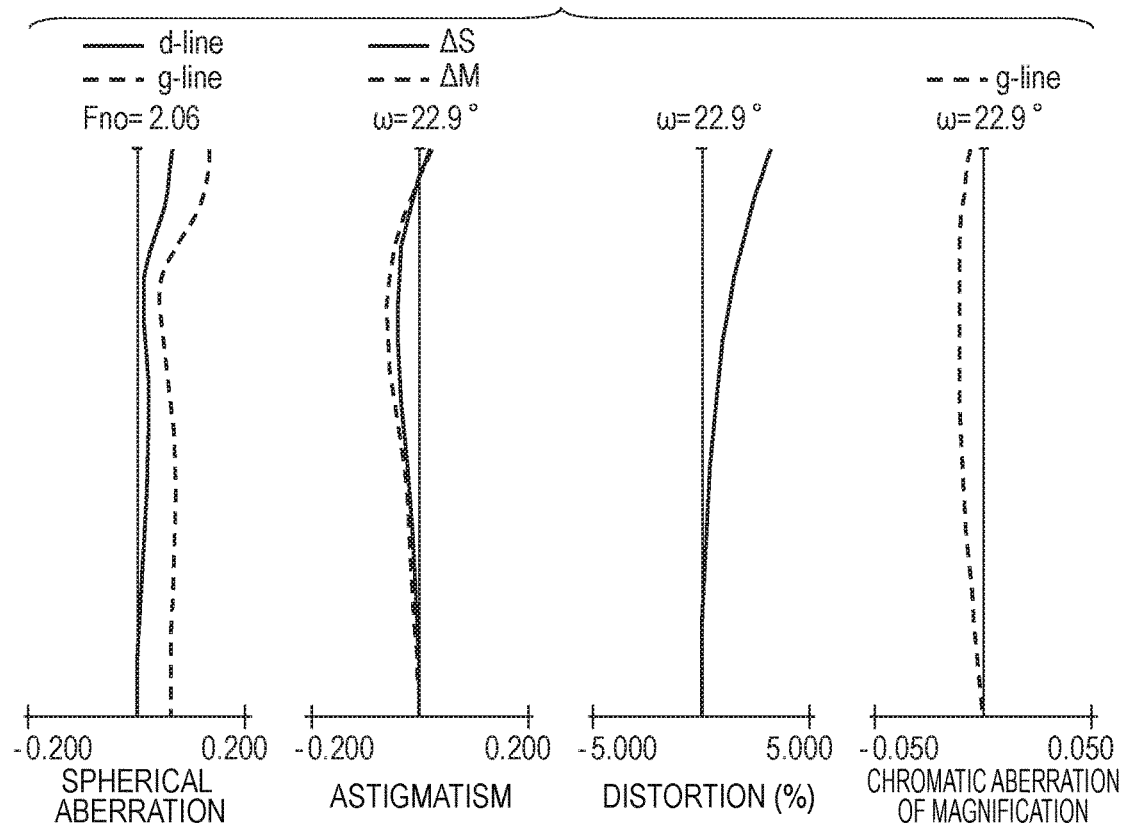

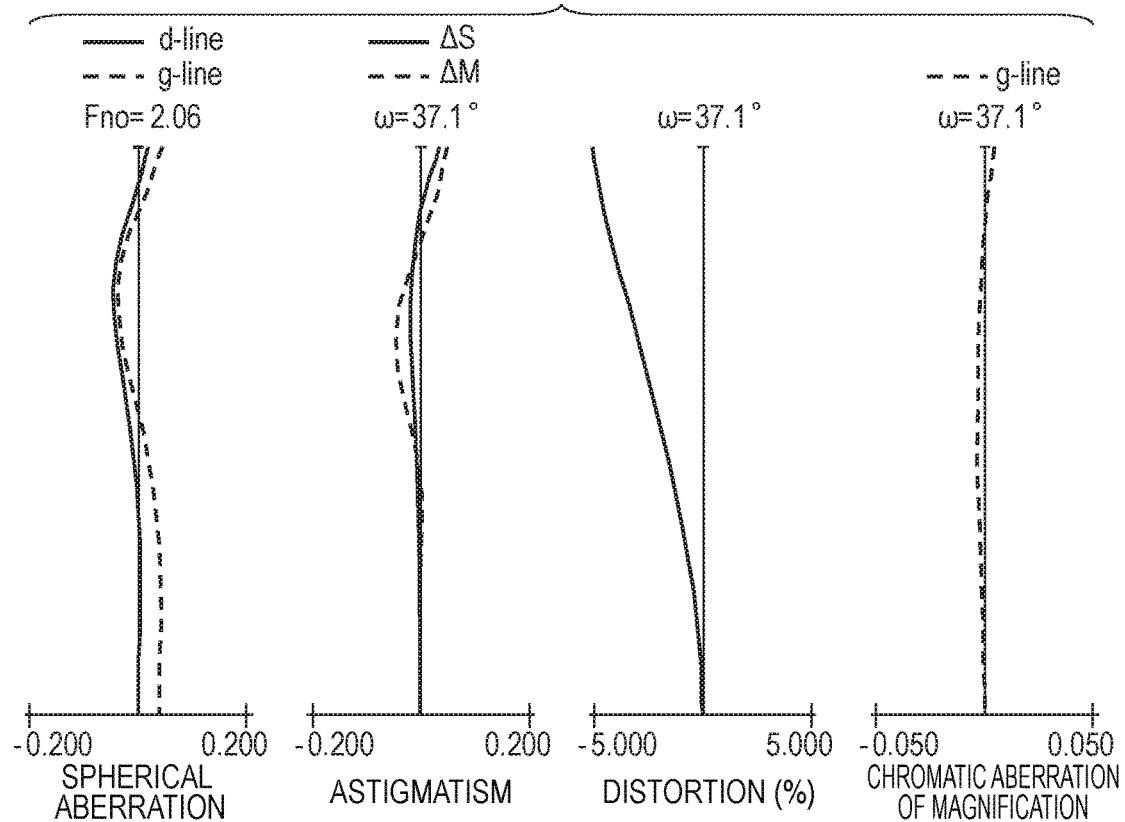
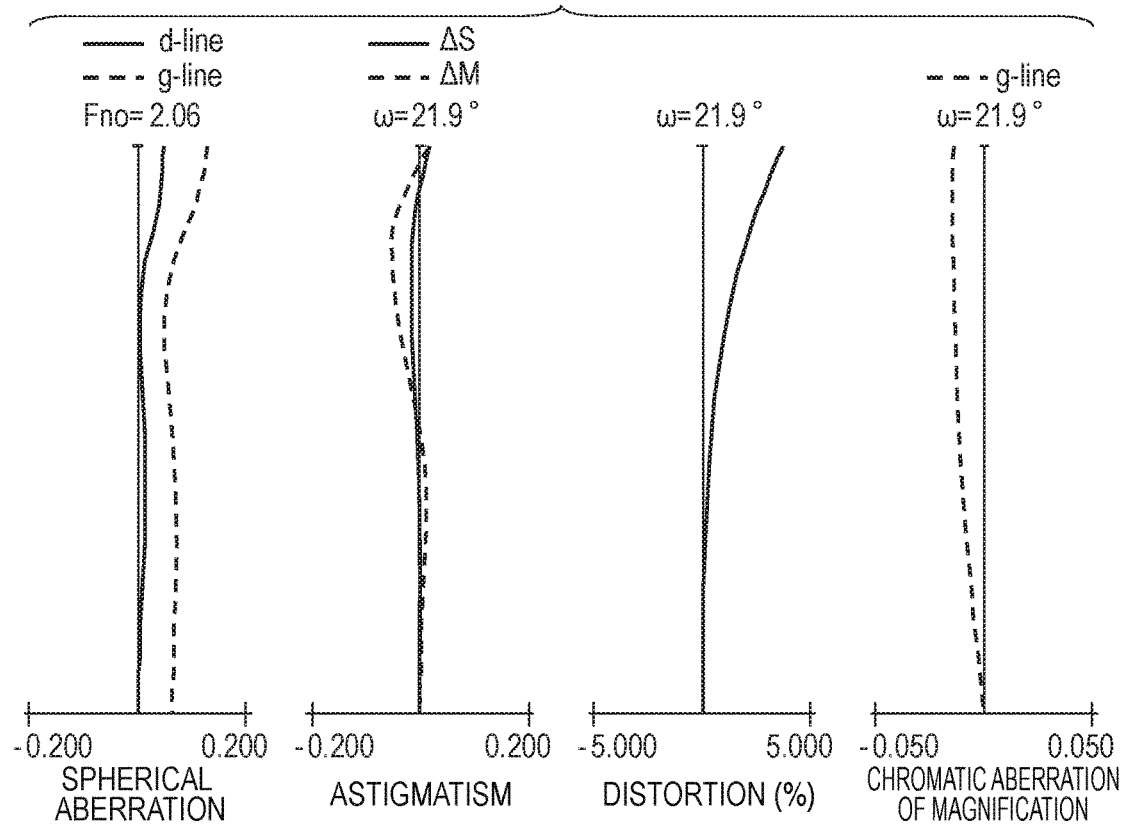

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, some of image pickup apparatus, such as a television camera, a cinema camera, a video camera, and a photographic camera, include a large sensor characterized by a shallow depth of field and beautiful bokeh (blur) quality for increased picture expression. As a zoom lens to be mounted to such image pickup apparatus, there is a demand for a zoom lens having a large aperture to obtain a shallower depth of field.

In order to satisfy such a demand, there is known a zoom lens including, in order from an object side, a lens unit having a positive refractive power that is arranged closest to the object side and is configured not to move for varying a magnification, a magnification-varying lens unit having a negative refractive power, an image-plane correcting lens unit having a negative refractive power, and a lens unit having a positive refractive power that is arranged closest to an image side and is configured not to move for varying the magnification.

In International Publication No. WO2013/038614, there is disclosed a zoom lens consisting of four lens units having positive, negative, negative, and positive refractive powers, and having an aperture ratio (F-number) of about 2.8 over an entire zoom range.

In Japanese Patent Application Laid-Open No. 2016-173481, there is disclosed a zoom lens consisting of five lens units having positive, positive, negative, negative, and positive refractive powers, and having an aperture ratio of about 2.8 over an entire zoom range.

In recent years, in order to downsize the image pickup apparatus, so-called mirrorless type cameras, in which an interval (flange back) from a mounting surface for a lens apparatus to an image plane is reduced, are emerging. The zoom lenses described in International Publication No. WO2013/038614 and Japanese Patent Application Laid-Open No. 2016-173481 achieve a large aperture over the entire zoom range, but are not downsized enough for the mirrorless type cameras.

SUMMARY OF THE INVENTION

An aspect of embodiments provides, for example, a zoom lens beneficial in a small size, a large aperture, and high resolution performance.

According to the aspect of embodiments, a zoom lens consists of in order from an object side to an image side: a front lens unit having a positive refractive power and configured not to move for zooming; a plurality of magnification-varying lens units including two magnification-varying lens units having negative refractive powers configured to move for zooming; and a rear lens unit having a positive refractive power and configured not to move for zooming, wherein conditional expressions:

$$2.7 < |f2n/fr| < 6.0; \text{ and}$$

$$0.5 < |ff/f1n| < 2.3,$$

are satisfied where ff is a focal length of the front lens unit, f1n is a focal length of a magnification-varying lens unit having a negative refractive power and arranged closest to the object side in the plurality of magnification-varying lens units, f2n is a focal length of a magnification-varying lens unit having a negative refractive power and arranged closest to the image side in the plurality of magnification-varying lens units, and fr is a focal length of the rear lens unit.

Further features of the present invention will become apparent from the following description of exemplary embodiments with reference to the attached drawings.

BRIEF DESCRIPTION OF THE DRAWINGS

FIG. 1 is a cross-sectional view of a zoom lens according to Embodiment 1 (Numerical Embodiment 1) of the present invention at a wide angle end.

FIG. 2 shows aberration diagrams of Numerical Embodiment 1 at the wide angle end.

FIG. 3 shows aberration diagrams of Numerical Embodiment 1 at an intermediate zoom position.

FIG. 10 shows aberration diagrams of Numerical Embodiment 3 at the wide angle end.

FIG. 11 shows aberration diagrams of Numerical Embodiment 3 at an intermediate zoom position.

FIG. 14 shows aberration diagrams of Numerical Embodiment 4 at the wide angle end.

FIG. 15 shows aberration diagrams of Numerical Embodiment 4 at an intermediate zoom position.

DESCRIPTION OF THE EMBODIMENTS

Exemplary embodiments of the present invention are now described in detail with reference to the accompanying drawings.

Figure 4:
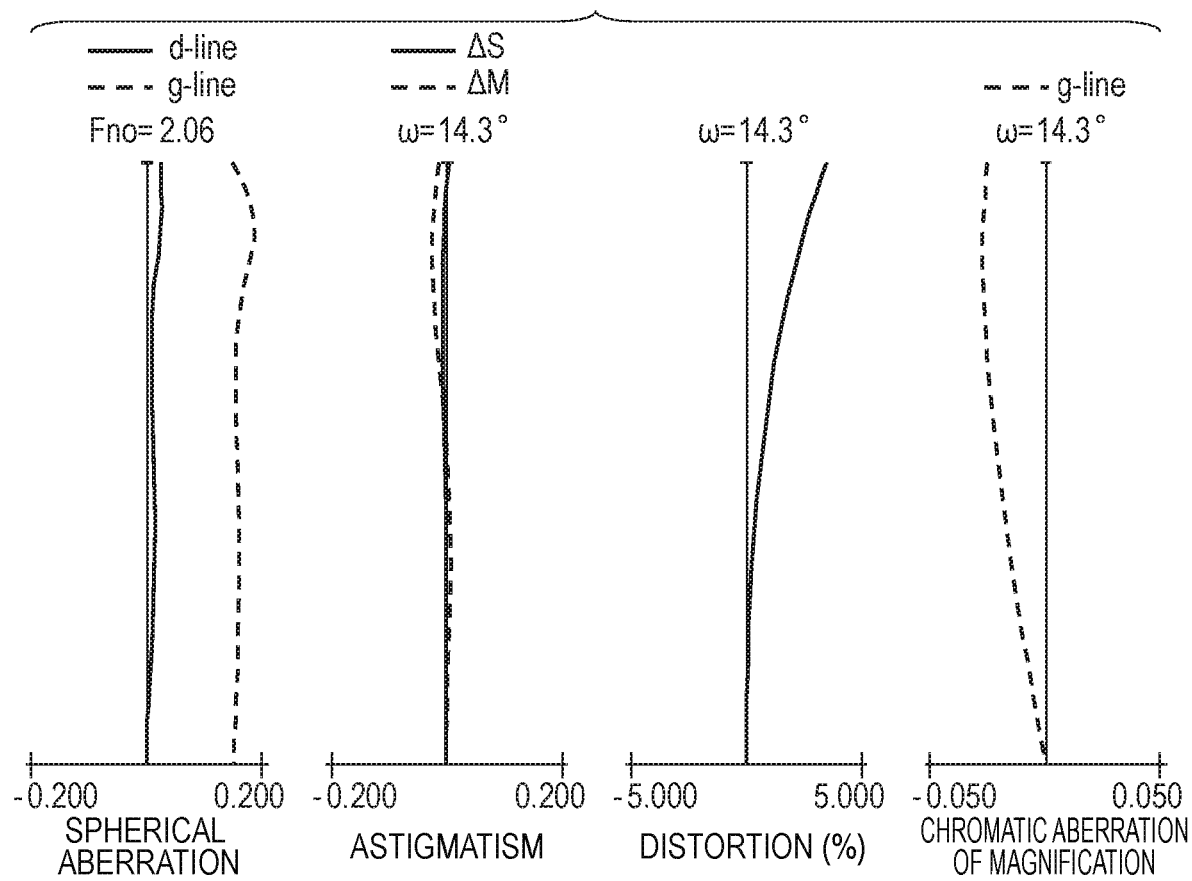
FIG. 4 shows aberration diagrams of Numerical Embodiment 1 at a telephoto end.

FIG. 1 is a lens cross-sectional view of a zoom lens according to Embodiment 1 of the present invention at a wide angle end (short focal length end). FIG. 2, FIG. 3, and FIG. 4 show aberration diagrams of the zoom lens according to Embodiment 1 at the wide angle end, at an intermediate zoom position, and at a telephoto end (long focal length end), respectively. Embodiment 1 represents a zoom lens having a zoom ratio of 2.97 and an aperture ratio of about 2.06.

Figure 5:
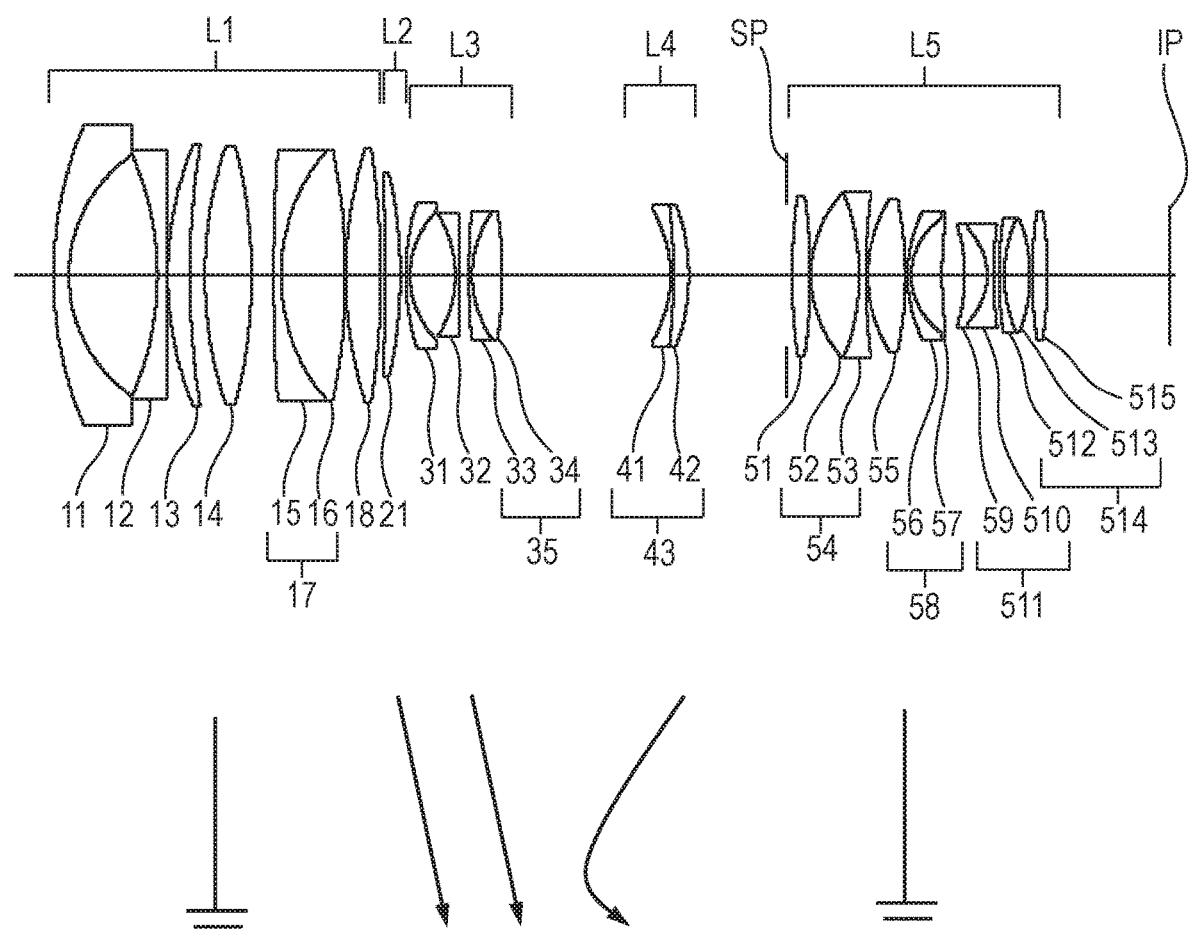
FIG. 5 is a cross-sectional view of a zoom lens according to Embodiment 2 (Numerical Embodiment 2) of the present invention at a wide angle end.
Figure 6:
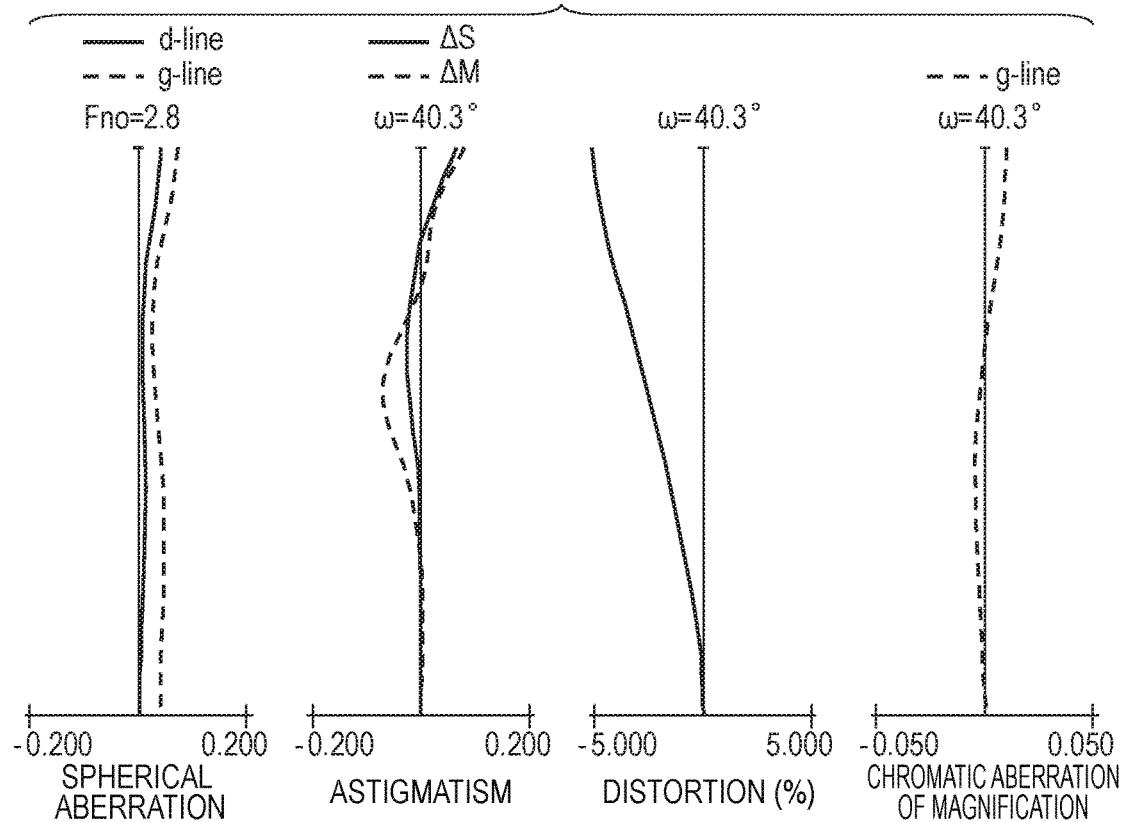
FIG. 6 shows aberration diagrams of Numerical Embodiment 2 at the wide angle end.
Figure 7:
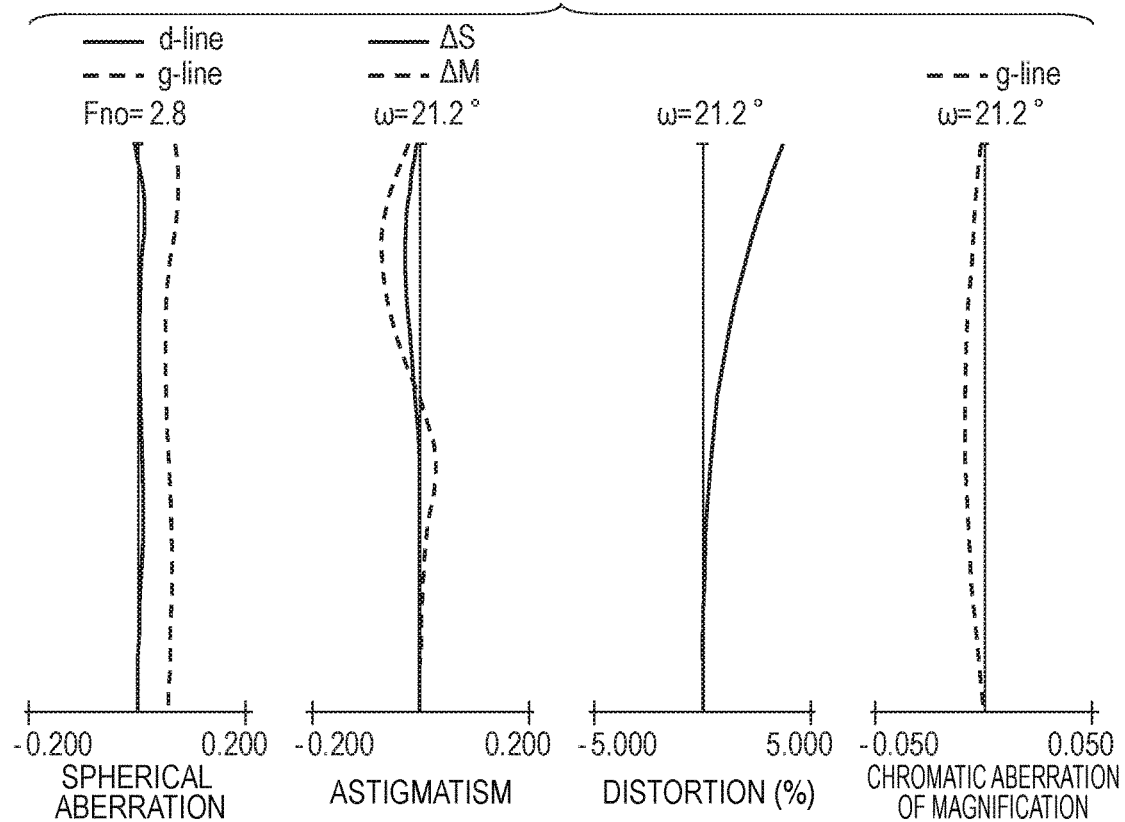
FIG. 7 shows aberration diagrams of Numerical Embodiment 2 at an intermediate zoom position.
Figure 8:
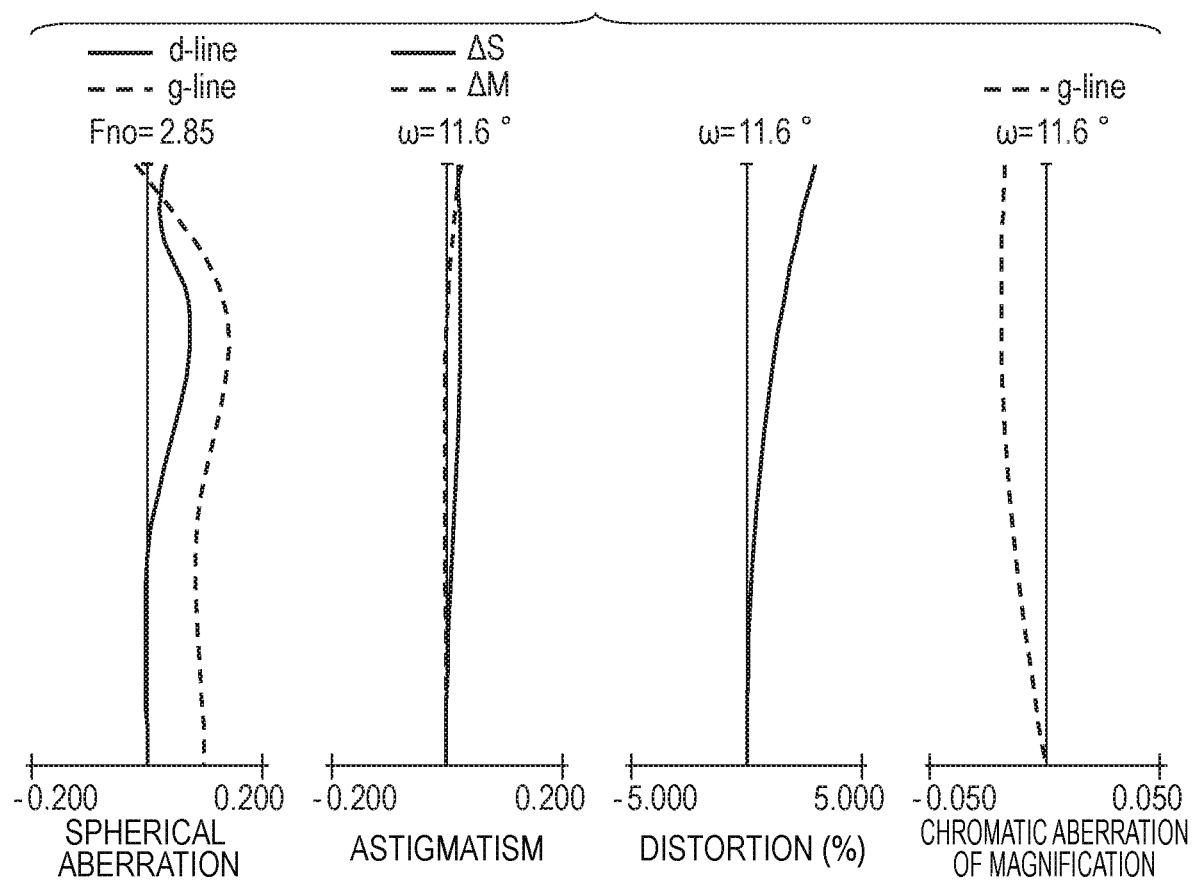
FIG. 8 shows aberration diagrams of Numerical Embodiment 2 at a telephoto end.

FIG. 5 is a lens cross-sectional view of a zoom lens according to Embodiment 2 of the present invention at a wide angle end. FIG. 6, FIG. 7, and FIG. 8 show aberration diagrams of the zoom lens according to Embodiment 2 at the wide angle end, at an intermediate zoom position, and at a telephoto end, respectively. Embodiment 2 represents a zoom lens having a zoom ratio of 4.12 and an aperture ratio of about 2.80.

Figure 9:
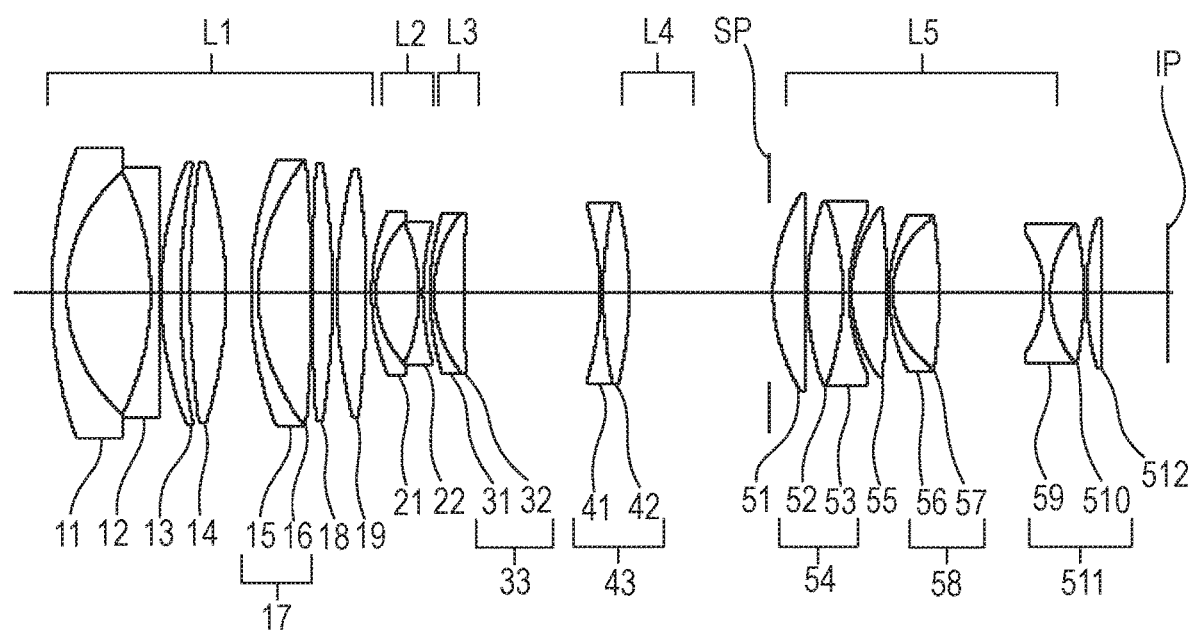
FIG. 9 is a cross-sectional view of a zoom lens according to Embodiment 3 (Numerical Embodiment 3) of the present invention at a wide angle end.
Figure 12:
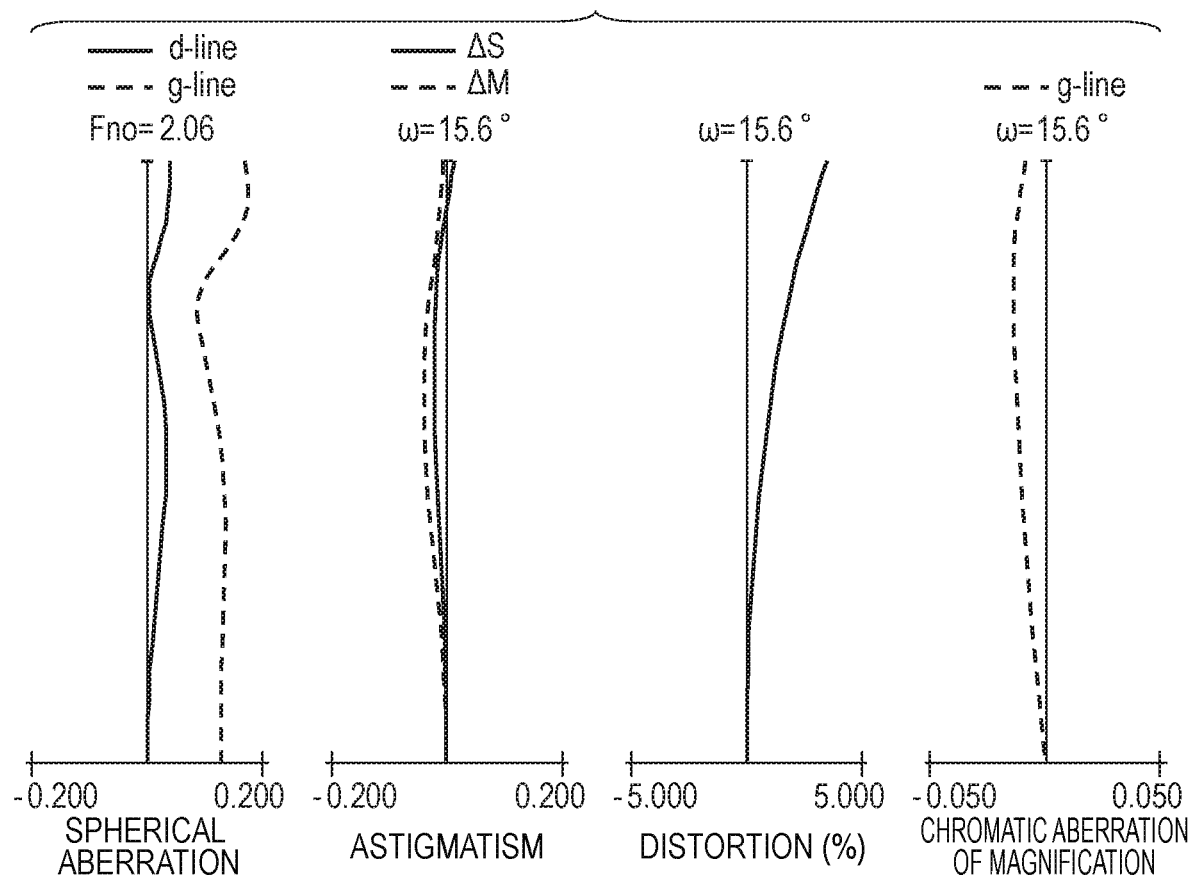
FIG. 12 shows aberration diagrams of Numerical Embodiment 3 at a telephoto end.

FIG. 9 is a lens cross-sectional view of a zoom lens according to Embodiment 3 of the present invention at a wide angle end. FIG. 10, FIG. 11, and FIG. 12 show aberration diagrams of the zoom lens according to Embodiment 3 at the wide angle end, at an intermediate zoom position, and at a telephoto end, respectively. Embodiment 3 represents a zoom lens having a zoom ratio of 2.63 and an aperture ratio of about 2.05.

Figure 13:
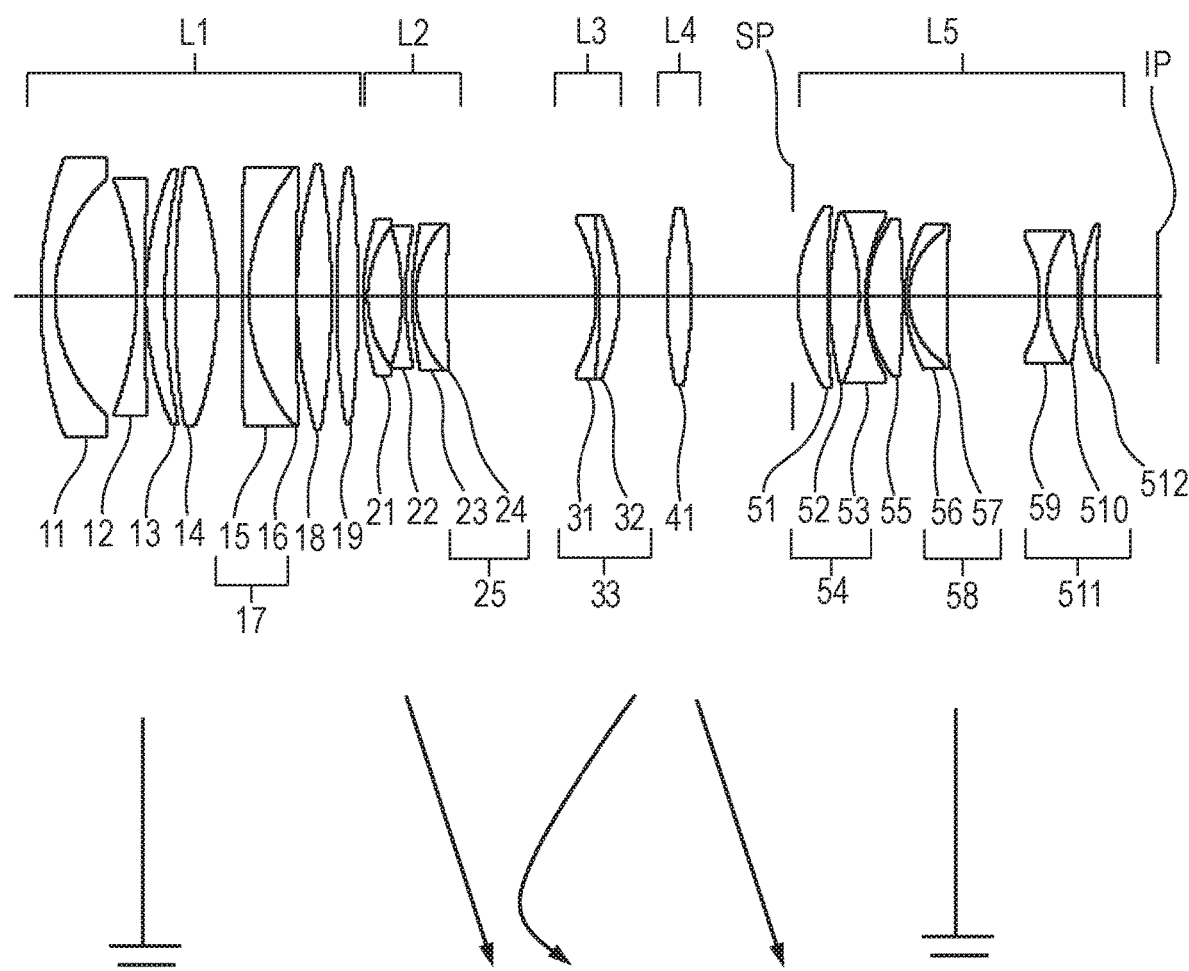
FIG. 13 is a cross-sectional view of a zoom lens according to Embodiment 4 (Numerical Embodiment 4) of the present invention at a wide angle end.
Figure 16:
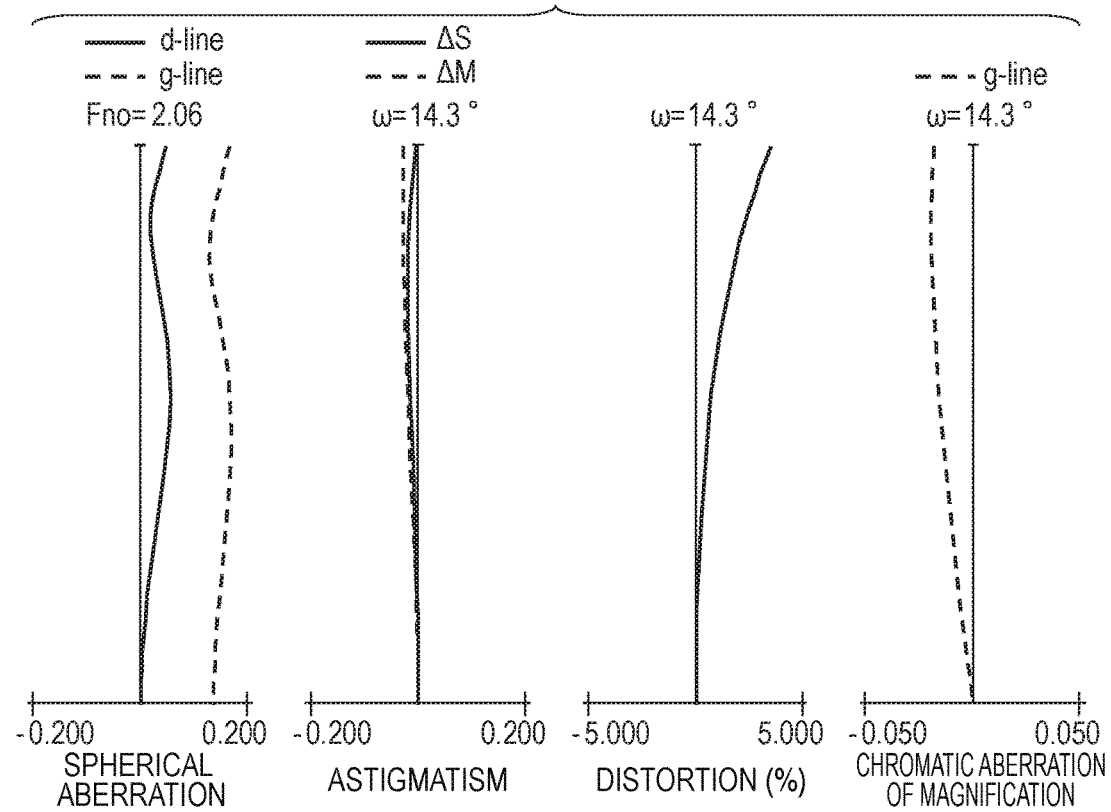
FIG. 16 shows aberration diagrams of Numerical Embodiment 4 at a telephoto end.

FIG. 13 is a lens cross-sectional view of a zoom lens according to Embodiment 4 of the present invention at a wide angle end. FIG. 14, FIG. 15, and FIG. 16 show aberration diagrams of the zoom lens according to Embodiment 4 at the wide angle end, at an intermediate zoom position, and at a telephoto end, respectively. Embodiment 4 represents a zoom lens having a zoom ratio of 2.97 and an aperture ratio of about 2.06.

In the lens cross-sectional views, i represents the order of each lens unit from an object side to an image side, and Li represents an i-th lens unit. An F-number determining member (hereinafter referred to as "aperture stop") SP acts as an aperture stop configured to determine (restrict) an open F-number (Fno) ray. An image plane IP is an image pickup plane of a solid image pickup element (photoelectric conversion element) such as a CCD sensor or a CMOS sensor when the zoom lens is used as a photographic optical system of a video camera or a digital camera. Further, when the zoom lens is used as a photographic optical system of a silver-halide film camera, the image plane IP is a photosensitive surface corresponding to a film surface. In the aberration diagrams, d and g represent a d-line and a g-line, respectively, and $\Delta M$ and $\Delta S$ represent a meridional image plane and a sagittal image plane, respectively. Further, axial chromatic aberration and chromatic aberration of magnification are indicated with respect to the g-line.

Next, features in obtaining the effects of the present invention, which are common to Embodiment, are described.

According to at least one embodiment of the present invention, there is provided a zoom lens consisting of, in order from an object side to an image side: a front lens unit having a positive refractive power, which is configured not to move for zooming; a plurality of magnification-varying lens units (also referred to as zoom lens units) and configured to move for zooming; and a rear lens unit having a positive refractive power and configured not to move for zooming. The plurality of magnification-varying lens units includes two magnification-varying lens units having negative refractive powers and configured to move for zooming. The zoom lens satisfies the following conditions:

$$2.7 < |f2n/fr| < 6.0 \quad (1); \text{ and}$$

$$0.5 < |ff/f1n| < 2.3 \quad (2).$$

In Conditional Expressions (1) and (2), ff is a focal length of the front lens unit, f1n is a focal length of a lens unit having a negative refractive power and arranged closest to the object side of the lens units included in the plurality of magnification-varying lens units, f2n is a focal length of a lens unit having a negative refractive power and arranged closest to the image side of the lens units included in the plurality of magnification-varying lens units, and fr is a focal length of the rear lens unit.

In at least one embodiment of the present invention, the front lens unit arranged closest to the object side is configured not to move during zooming, to thereby save power of a drive source required for zooming, and increase strength of suppressing minute image blur during zooming.

Further, the two lens units having the negative refractive powers included in the plurality of magnification-varying lens units are movable to vary the magnification and correct the image plane of the zoom lens.

Still further, the rear lens unit configured not to move during zooming is arranged closest to the image side, to thereby satisfactorily correct various aberrations generated in the plurality of magnification-varying lens units and the preceding lens units.

Yet further, Conditional Expressions (1) and (2) are satisfied to achieve both downsizing of a large aperture zoom lens compatible with a mirrorless type camera and high performance.

Conditional Expression (1) defines a ratio of the focal length f2n of the lens unit having the negative refractive power that is closest to the image side of the lens units included in the plurality of magnification-varying lens units and the focal length fr of the rear lens unit.

When the upper-limit condition of the Conditional Expression (1) is not satisfied, the focal length of the lens unit having the negative refractive power that is closest to the image side of the lens units included in the plurality of magnification-varying lens units becomes much longer. As a result, when the lens unit is used as an image-plane correcting lens unit during zooming, it becomes difficult to reduce a movement amount thereof, and it becomes difficult to reduce a total lens length.

When the lower-limit condition of the Conditional Expression (1) is not satisfied, the focal length of the rear lens unit becomes much longer with respect to the focal length of the lens unit having the negative refractive power that is closest to the image side of the lens units included in the plurality of magnification-varying lens units, and an action of converging an axial ray by the rear lens unit becomes much weaker. As a result, it becomes difficult to reduce a distance from the rear lens unit to the image plane, and hence to reduce the total lens length.

It is further preferred, in order to increase the effects of the embodiments, to set the ranges of Conditional Expressions (1) and (2) to the following ranges:

$$2.7 < |f2n/fr| < 5.0 \quad (1a); \text{ and}$$

$$1.0 < |ff/f1n| < 2.3 \quad (2a).$$

It is still further preferred to set the numerical ranges of Conditional Expressions (1a) to (2a) to the following ranges:

$$2.7 < |f2n/fr| < 4.5 \quad (1b); \text{ and}$$

$$1.2 < |ff/f1n| < 2.3 \quad (2b).$$

Further, the following conditional expression is satisfied:

$$0.140 < m1n/L < 0.400 \quad (3)$$

where m1n represents an absolute value of a maximum movement amount during zooming of a lens unit having a negative refractive power that is closest to the object side of the lens units included in the plurality of magnification-varying lens units, and L represents a distance from a vertex of a surface on the object side of a lens closest to the object side in the front lens unit to the image plane.

When the upper-limit condition of the Conditional Expression (3) is not satisfied, the movement amount of the lens unit having the negative refractive power that is closest to the object side of the lens units included in the plurality of magnification-varying lens units becomes much larger. Therefore, when the lens unit is used as a magnification-varying lens unit during zooming, an actuator required for zooming is increased in size, and hence it becomes difficult to downsize the zoom lens.

When the lower-limit condition of the Conditional Expression (3) is not satisfied, the movement amount of the lens unit having the negative refractive power that is closest to the object side of the lens units included in the plurality of magnification-varying lens units becomes much smaller. Therefore, when the lens unit is used as a magnification-varying lens unit during zooming, in order to obtain a desired magnification-varying effect, the refractive power of the lens unit having the negative refractive power that is closest to the object side of the lens units included in the plurality of magnification-varying lens units becomes much stronger, and it becomes difficult to correct chromatic aberration of magnification at the wide angle end.

Still further, the following conditional expression is satisfied:

$$0.05 < BF/Lr < 0.35 \quad (4)$$

where Lr represents a distance from a vertex of a surface on the object side of a lens closest to the object side in the rear lens unit to the image plane, and BF represents a distance from a vertex of a surface on the image side of a lens closest to the image side in the rear lens unit to the image plane.

When the upper-limit condition of the Conditional Expression (4) is not satisfied, the distance from the vertex of the surface on the object side of the lens closest to the image side in the rear lens unit to the image plane becomes much longer, and it becomes difficult to reduce the total lens length.

When the lower-limit condition of the Conditional Expression (4) is not satisfied, the distance from the vertex of the surface on the object side of the lens closest to the image side in the rear lens unit to the image plane becomes much shorter, and it becomes difficult to secure a space for avoiding interference with the image pickup plane.

Yet further, the following conditional expression is satisfied:

$$-1.0 < \beta r < -0.2 \quad (5)$$

where $\beta r$ represents a lateral magnification of the rear lens unit.

When the upper-limit condition of the Conditional Expression (5) is not satisfied, the action of converging the axial ray by the rear lens unit becomes much smaller, and it becomes difficult to reduce the distance from the rear lens unit to the image plane, and hence to reduce the total lens length.

When the lower-limit condition of the Conditional Expression (5) is not satisfied, the action of converging the axial ray by the rear lens unit becomes much stronger, and it becomes difficult to correct spherical aberration over an entire zoom range, which is generated in the rear lens unit.

Yet further, a front principal point of the rear lens unit is located on the object side of the vertex of the surface on the object side of the lens closest to the object side in the rear lens unit. The following conditional expression is satisfied:

$$0.08 < o1r/Lr < 0.20 \quad (6)$$

where o1r represents a distance from the vertex of the surface on the object side of the lens closest to the object side in the rear lens unit to the front principal point of the rear lens unit, and Lr represents a distance from the vertex of the surface on the object side of the lens closest to the object side in the rear lens unit to the image plane.

When the upper limit condition of the Conditional Expression (6) is exceeded, and the front principal point of the rear lens unit is shifted to the object side, it becomes difficult to correct curvature of field generated in the rear lens unit.

When the lower-limit condition of the Conditional Expression (6) is not satisfied, the front principal point of the rear lens unit becomes excessively separated from a rear principal point of the plurality of magnification-varying lens units, and it becomes difficult to reduce the distance from the rear lens unit to the image plane, and hence to reduce the total lens length.

Yet further, the rear lens unit is divided, over a largest air gap, into a front lens sub-unit having a positive refractive power and a rear lens sub-unit having a negative refractive power. The following expression is satisfied:

$$0.1 < |frp/frn| < 0.7 \quad (7)$$

where frp represents a focal length of the front lens sub-unit, and frn represents a focal length of the rear lens sub-unit.

When the upper-limit condition of the Conditional Expression (7) is not satisfied, the focal length of the front lens sub-unit becomes much longer than the focal length of the rear lens sub-unit, and the action of bringing the front principal point of the rear lens unit closer to the object side becomes much weaker, with the result that it becomes difficult to reduce the distance from the rear lens unit to the image plane, and hence to reduce the total lens length.

When the lower-limit condition of the Conditional Expression (7) is not satisfied, the focal length of the front lens sub-unit becomes much shorter than the focal length of the rear lens sub-unit, and it becomes difficult to correct spherical aberration and curvature of field over the entire zoom range.

Further, it is preferred that the front lens sub-unit included in the rear lens unit include a plurality of positive lenses each having an Abbe number that satisfies the following conditional expression:

$$75.0 < vd < 100 \quad (8).$$

An Abbe number vd is expressed by the following expression:

$$vd = (Nd - 1)/(NF - NC),$$

where NF, Nd, and NC represent refractive indices with respect to an F-line (wavelength: 486.1 nm), the d-line (wavelength: 587.6 nm), and a C-line (wavelength: 656.3 nm) of the Fraunhofer lines, respectively.

When the upper-limit condition of the Conditional Expression (8) is not satisfied, the refractive indices become much smaller with real optical materials. Therefore, when a desired refractive power is to be obtained with the front lens sub-unit, curvatures of the positive lenses included in the front lens sub-unit become much smaller. As a result, it becomes difficult to correct spherical aberration and curvature of field over the entire zoom range.

When the lower-limit condition of the Conditional Expression (8) is not satisfied, axial chromatic aberration generated in the front lens sub-unit becomes much larger, and it becomes difficult to correct axial chromatic aberration over the entire zoom range.

Still further, in order to increase the effects of the embodiments, it is preferred to set the ranges of Conditional Expressions (3) to (7) to the following ranges:

$$0.145 < m1n/L < 0.400 \quad (3a)$$

$$0.1 < BF/Lr < 0.33 \quad (4a)$$

$$-1.0 < \beta r < -0.23 \quad (5a)$$

$$0.09 < o1r/Lr < 0.16 \quad (6a); \text{ and}$$

$$0.15 < |frp/frn| < 0.65 \quad (7a).$$

Yet further, the zoom lens proposed by the present invention can achieve even higher performance over the entire zoom range when used in conjunction with a system configured to correct an electric signal including distortion and chromatic aberration of magnification by image processing.

Next, configurations of the zoom lenses according to Embodiments of the present invention are described in detail.

Embodiment 1

In the zoom lens according to Embodiment 1, during zooming from a wide angle end to a telephoto end, a first lens unit L1 having a positive refractive power and a fourth lens unit L4 having a positive refractive power are configured not to move, and a second lens unit L2 having a negative refractive power and a third lens unit L3 having a negative refractive power are configured to move. Specifically, during zooming from the wide angle end to the telephoto end, the second lens unit L2 and the third lens unit L3 are configured to move so that an interval between the first lens unit L1 and the second lens unit L2 is increased and an interval between the second lens unit L2 and the third lens unit L3 is reduced. An aperture stop SP is provided on the object side of the fourth lens unit L4. Focusing can be performed through moving a suitable lens unit in an optical axis direction, but it is desired that focusing be performed through driving a part of the first lens unit L1 having the positive refractive power.

Now, configurations within the first lens unit L1 to the fourth lens unit L4 in Embodiment 1 are described.

The first lens unit L1 in Embodiment 1 consists of, in order from the object side, a negative meniscus lens 11 with a strong concave surface thereof facing the image side, a negative lens 12, a positive meniscus lens 13, a positive lens 14, a cemented lens 17 formed of a negative lens 15 and a positive lens 16, a positive lens 18, and a positive lens 19.

With the above-mentioned configuration, the negative meniscus lens 11 with a convex surface thereof facing the object side, and the negative lens 12 are arranged on the object side in the stated order from the object side to obtain a configuration that is beneficial in achieving a wide angle of the zoom lens, and the positive refractive power of the first lens unit L1 is shared by the positive lens 13, the positive lens 14, the cemented lens 17, the positive lens 18, and the positive lens 19. This configuration reduces various aberrations generated in the first lens unit L1, in particular, generation of axial chromatic aberration and curvature of field at the telephoto end.

The second lens unit L2 in Embodiment 1 consists of, in order from the object side, a negative lens 21 with a strong concave surface thereof facing the image side, a negative lens 22, and a cemented lens 25 formed of a negative lens 23 and a positive lens 24. With this configuration, the negative refractive power of the second lens unit L2 is shared by two negative lenses, and one cemented lens is included to reduce various aberrations generated in the second lens unit L2, in particular, curvature of field over the entire zoom range and chromatic aberration of magnification at the wide angle end.

The third lens unit L3 in Embodiment 1 consists of a cemented lens 33 formed of a negative lens 31 with a concave surface thereof facing the object side and a positive lens 32 in order from the object side. The third lens unit L3 thus consists of one cemented lens to reduce the weight of the third lens unit itself and generation of axial chromatic aberration over an entire magnification-varying range.

The fourth lens unit L4 in Embodiment 1 is divided, over a largest air gap, into a front lens sub-unit having a positive refractive power and a rear lens sub-unit having a negative refractive power.

The front lens sub-unit consists of, in order from the object side, a positive lens 41, a cemented lens 44 formed of a positive lens 42 and a negative lens 43, a positive lens 45, and a cemented lens 48 formed of a negative lens 46 and a positive lens 47. With this configuration, the positive refractive power of the front lens sub-unit of the fourth lens unit L4 is shared by the plurality of positive lenses to reduce various aberrations generated in the front lens sub-unit of the fourth lens unit L4, in particular, generation of spherical aberration and curvature of field over the entire magnification-varying range.

The rear lens sub-unit consists of a cemented lens 411 formed of a negative lens 49 and a positive lens 410, and a positive lens 412. The rear lens sub-unit of the fourth lens unit L4 thus includes the cemented lens to reduce various aberrations generated in the rear lens sub-unit, in particular, generation of chromatic aberration of magnification over the entire magnification-varying range.

Embodiment 2

In the zoom lens according to Embodiment 2, during zooming from a wide angle end to a telephoto end, a first lens unit L1 having a positive refractive power and a fifth lens unit L5 having a positive refractive power are configured not to move, and a second lens unit L2 having a positive refractive power, a third lens unit L3 having a negative refractive power, and a fourth lens unit L4 having a negative refractive power are configured to move.

Specifically, during zooming from the wide angle end to the telephoto end, the second lens unit L2 to the fourth lens unit L4 are configured to move so that an interval between the first lens unit L1 and the second lens unit L2 and an interval between the second lens unit L2 and the third lens unit L3 are increased, and an interval between the third lens unit L3 and the fourth lens unit L4 is reduced. An aperture stop SP is provided on the object side of the fifth lens unit L5. Focusing can be performed through moving a suitable lens unit in an optical axis direction, but it is desired that focusing be performed through driving a part of the first lens unit L1 having the positive refractive power.

Now, configurations within the first lens unit L1 to the fifth lens unit L5 in Embodiment 2 are described.

The first lens unit L1 in Embodiment 2 consists of, in order from the object side, a negative meniscus lens 11 with a strong concave surface thereof facing the image side, a negative lens 12, a positive meniscus lens 13, a positive lens 14, a cemented lens 17 formed of a negative lens 15 and a positive lens 16, and a positive lens 18.

With the above-mentioned configuration, the negative meniscus lens 11 with a convex surface thereof facing the object side, and the negative lens 12 are arranged on the object side in the stated order from the object side to obtain a configuration that is beneficial in achieving a wide angle of the zoom lens, and the positive refractive power of the first lens unit L1 is shared by the positive lens 13, the positive lens 14, the cemented lens 17, and the positive lens 18. This configuration reduces various aberrations generated in the first lens unit L1, in particular, generation of axial chromatic aberration and curvature of field at the telephoto end.

The second lens unit L2 in Embodiment 2 consists of one positive lens 21. With this configuration, astigmatism in an intermediate zoom range is corrected while the second lens unit L2 is reduced in weight.

The third lens unit L3 in Embodiment 2 consists of, in order from the object side, a negative lens 31 with a strong concave surface thereof facing the image side, a negative lens 32, and a cemented lens 35 formed of a negative lens 33 and a positive lens 34. With this configuration, the negative refractive power of the third lens unit L3 is shared by two negative lenses, and one cemented lens is included to reduce various aberrations generated in the third lens unit L3, in particular, curvature of field over the entire zoom range and chromatic aberration of magnification at the wide angle end.

The fourth lens unit L4 in Embodiment 2 consists of a cemented lens 43 formed of a negative lens 41 with a concave surface thereof facing the object side and a positive lens 42 in order from the object side. The fourth lens unit L4 thus consists of one cemented lens to reduce the weight of the fourth lens unit itself and generation of axial chromatic aberration over an entire magnification-varying range.

The fifth lens unit L5 in Embodiment 2 is divided, over a largest air gap, into a front lens sub-unit having a positive refractive power and a rear lens sub-unit having a negative refractive power.

The front lens sub-unit consists of, in order from the object side, a positive lens 51, a cemented lens 54 formed of a positive lens 52 and a negative lens 53, a positive lens 55, and a cemented lens 58 formed of a negative lens 56 and a positive lens 57. With this configuration, the positive refractive power of the front lens sub-unit of the fifth lens unit L5 is shared by the plurality of positive lenses to reduce various aberrations generated in the front lens sub-unit of the fifth lens unit L5, in particular, generation of spherical aberration and curvature of field over the entire magnification-varying range.

The rear lens sub-unit consists of a cemented lens 511 formed of a positive lens 59 and a negative lens 510, a cemented lens 514 formed of a negative lens 512 and a positive lens 513, and a positive lens 515. The rear lens sub-unit of the fifth lens unit L5 thus includes the plurality of cemented lenses to reduce various aberrations generated in the rear lens sub-unit, in particular, generation of chromatic aberration of magnification over the entire magnification-varying range.

Embodiment 3

In the zoom lens according to Embodiment 3, during zooming from a wide angle end to a telephoto end, a first lens unit L1 having a positive refractive power and a fifth lens unit L5 having a positive refractive power are configured not to move, and a second lens unit L2 having a negative refractive power, a third lens unit L3 having a positive refractive power, and a fourth lens unit L4 having a negative refractive power are configured to move.

Specifically, during zooming from the wide angle end to the telephoto end, the second lens unit L2 to the fourth lens unit L4 are configured to move so that an interval between the first lens unit L1 and the second lens unit L2 is increased, an interval between the second lens unit L2 and the third lens unit L3 is increased, and an interval between the third lens unit L3 and the fourth lens unit L4 is reduced.

An aperture stop SP is provided on the object side of the fifth lens unit L5. Focusing can be performed through moving a suitable lens unit in an optical axis direction, but it is desired that focusing be performed through driving a part of the first lens unit L1 having the positive refractive power.

Now, configurations within the first lens unit L1 to the fifth lens unit L5 in Embodiment 3 are described.

The first lens unit L1 in Embodiment 3 consists of, in order from the object side, a negative meniscus lens 11 with a strong concave surface thereof facing the image side, a negative lens 12, a positive meniscus lens 13, a positive lens 14, a cemented lens 17 formed of a negative lens 15 and a positive lens 16, a positive lens 18, and a positive lens 19.

With the above-mentioned configuration, the negative meniscus lens 11 with a convex surface thereof facing the object side, and the negative lens 12 are arranged on the object side in the stated order from the object side to obtain a configuration that is beneficial in achieving a wide angle of the zoom lens, and the positive refractive power of the first lens unit L1 is shared by the positive lens 13, the positive lens 14, the cemented lens 17, the positive lens 18, and the positive lens 19. This configuration reduces various aberrations generated in the first lens unit L1, in particular, generation of axial chromatic aberration and curvature of field at the telephoto end.

The second lens unit L2 in Embodiment 3 consists of, in order from the object side, a negative lens 21 with a strong concave surface thereof facing the image side and a negative lens 22. With this configuration, the negative refractive power of the second lens unit L2 is shared by two negative lenses to reduce various aberrations generated in the second lens unit L2, in particular, curvature of field over the entire zoom range.

The third lens unit L3 in Embodiment 3 consists of a cemented lens 33 formed of a negative lens 31 and a positive lens 32. With this configuration, the third lens unit L3 consists of one cemented lens to reduce the weight of the third lens unit L3, and various aberrations generated in the third lens unit L3, in particular, chromatic aberration of magnification at the wide angle end.

The fourth lens unit L4 in Embodiment 3 consists of a cemented lens 43 formed of a negative lens 41 with a concave surface thereof facing the object side and a positive lens 42 in order from the object side. The fourth lens unit L4 thus consists of one cemented lens to reduce the weight of the fourth lens unit itself and generation of axial chromatic aberration over an entire magnification-varying range.

The fifth lens unit L5 in Embodiment 3 is divided, over a largest air gap, into a front lens sub-unit having a positive refractive power and a rear lens sub-unit having a negative refractive power.

The front lens sub-unit consists of, in order from the object side, a positive lens 51, a cemented lens 54 formed of a positive lens 52 and a negative lens 53, a positive lens 55, and a cemented lens 58 formed of a negative lens 56 and a positive lens 57. With this configuration, the positive refractive power of the front lens sub-unit of the fifth lens unit L5 is shared by the plurality of positive lenses to reduce various aberrations generated in the front lens sub-unit of the fifth lens unit L5, in particular, generation of spherical aberration and curvature of field over the entire magnification-varying range.

The rear lens sub-unit consists of a cemented lens 511 formed of a negative lens 59 and a positive lens 510, and a positive lens 512. The rear lens sub-unit of the fifth lens unit L5 thus includes the cemented lens to reduce various aberrations generated in the rear lens sub-unit, in particular, generation of chromatic aberration of magnification over the entire magnification-varying range.

Embodiment 4

In the zoom lens according to Embodiment 4, during zooming from a wide angle end to a telephoto end, a first lens unit L1 having a positive refractive power and a fifth lens unit L5 having a positive refractive power are configured not to move, and a second lens unit L2 having a negative refractive power, a third lens unit L3 having a negative refractive power, and a fourth lens unit L4 having a positive refractive power are configured to move.

Specifically, during zooming from the wide angle end to the telephoto end, the second lens unit L2 to the fourth lens unit L4 are configured to move so that an interval between the first lens unit L1 and the second lens unit L2 is increased, an interval between the second lens unit L2 and the third lens unit L3 is reduced, and an interval between the third lens unit L3 and the fourth lens unit L4 is reduced.

An aperture stop SP is provided on the object side of the fifth lens unit L5. Focusing can be performed through moving a suitable lens unit in an optical axis direction, but it is desired that focusing be performed through driving a part of the first lens unit L1 having the positive refractive power.

Now, configurations within the first lens unit L1 to the fifth lens unit L5 in Embodiment 4 are described.

The first lens unit L1 in Embodiment 4 consists of, in order from the object side, a negative meniscus lens 11 with a strong concave surface thereof facing the image side, a negative lens 12, a positive meniscus lens 13, a positive lens 14, a cemented lens 17 formed of a negative lens 15 and a positive lens 16, a positive lens 18, and a positive lens 19.

With the above-mentioned configuration, the negative meniscus lens 11 with a convex surface thereof facing the object side, and the negative lens 12 are arranged on the object side in the stated order from the object side to obtain a configuration that is beneficial in achieving a wide angle of the zoom lens, and the positive refractive power of the first lens unit L1 is shared by the positive lens 13, the positive lens 14, the cemented lens 17, the positive lens 18, and the positive lens 19. This configuration reduces various aberrations generated in the first lens unit L1, in particular, generation of axial chromatic aberration and curvature of field at the telephoto end.

The second lens unit L2 in Embodiment 4 consists of, in order from the object side, a negative lens 21 with a strong concave surface thereof facing the image side, a negative lens 22, and a cemented lens 25 formed of a negative lens 23 and a positive lens 24. With this configuration, the negative refractive power of the second lens unit L2 is shared by two negative lenses, and one cemented lens is included to reduce various aberrations generated in the second lens unit L2, in particular, curvature of field over the entire zoom range and chromatic aberration of magnification at the wide angle end.

The third lens unit L3 in Embodiment 4 consists of a cemented lens 33 formed of a negative lens 31 with a concave surface thereof facing the object side and a positive lens 32 in order from the object side. The third lens unit L3 thus consists of one cemented lens to reduce the weight of the third lens unit itself and generation of axial chromatic aberration over an entire magnification-varying range.

The fourth lens unit L4 in Embodiment 4 consists of one positive lens 41. With this configuration, spherical aberration over the entire zoom range is corrected while the fourth lens unit L4 is reduced in weight.

The fifth lens unit L5 in Embodiment 4 is divided, over a largest air gap, into a front lens sub-unit having a positive refractive power and a rear lens sub-unit having a negative refractive power.

The front lens sub-unit consists of, in order from the object side, a positive lens 51, a cemented lens 54 formed of a positive lens 52 and a negative lens 53, a positive lens 55, and a cemented lens 58 formed of a negative lens 56 and a positive lens 57. With this configuration, the positive refractive power of the front lens sub-unit of the fifth lens unit L5 is shared by the plurality of positive lenses to reduce various aberrations generated in the front lens sub-unit of the fifth lens unit L5, in particular, generation of spherical aberration and curvature of field over the entire magnification-varying range.

The rear lens sub-unit consists of a cemented lens 511 formed of a negative lens 59 and a positive lens 510, and a positive lens 512. The rear lens sub-unit of the fifth lens unit L5 thus includes the cemented lens to reduce various aberrations generated in the rear lens sub-unit, in particular, generation of chromatic aberration of magnification over the entire magnification-varying range. In Embodiments, a suitable lens unit may be moved in a direction perpendicular to an optical axis to perform image stabilization.

Next, Numerical Embodiment corresponding to Embodiments of the present invention are described. In Numerical Embodiments, i represents the order of a surface counted from the object side, Ri represents a curvature radius of a lens surface, Di represents a lens thickness or an air gap between an i-th surface and an (i+1)th surface, and Ndi and vdi represent a refractive index and an Abbe number with respect to the d-line, respectively.

Meanings of symbols used in Numerical Embodiments are as follows. In Numerical Embodiments, Ri represents a curvature radius of the i-th lens surface in order from the object side, Di represents the i-th lens thickness and air gap in order from the object side, and Ni and vi represent a refractive index and an Abbe number of a medium between the i-th surface and the (i+1)th surface in order from the object side with respect to the d-line, respectively.

When an X axis is defined in an optical axis direction, an H axis is defined in a direction perpendicular to the optical axis, a paraxial curvature radius is represented by R with a traveling direction of light being positive, a conic constant is represented by K, and aspherical coefficients are represented by A4, A6, A8, A10, A12, A14, and A16, an aspherical shape is expressed by the following expression.

$$X = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12} + A14 \times H^{14} + A16 \times H^{16}$$

Further, "e+x" means "$\times 10^{+x}$" and "e-x" means "$\times 10^{-x}$". A surface number with a symbol "*" means a surface having an aspherical shape.

Numerical Embodiment 1

| | | Unit: mm | | | |
|---|---|---|---|---|---|
| | | Surface data | | | |
| Surface number | r | d | nd | vd | Effective diameter |
| 1* | 80.135 | 3.00 | 2.02204 | 29.1 | 60.68 |
| 2 | 32.951 | 18.11 | | | 50.46 |
| 3 | −62.066 | 2.00 | 1.88067 | 41.1 | 50.19 |
| 4 | −1,776.801 | 0.08 | | | 52.17 |
| 5 | 72.872 | 5.42 | 1.73520 | 41.6 | 55.06 |
| 6 | 218.615 | 2.00 | | | 54.93 |
| 7 | 234.279 | 7.96 | 1.43875 | 94.9 | 55.03 |
| 8* | −92.825 | 5.47 | | | 55.42 |
| 9 | 259.085 | 1.47 | 1.81474 | 37.0 | 55.62 |
| 10 | 44.508 | 10.50 | 1.45650 | 90.3 | 54.80 |
| 11 | 523.657 | 0.50 | | | 55.33 |
| 12 | 100.090 | 10.01 | 1.69760 | 55.5 | 57.25 |
| 13 | −97.082 | 0.50 | | | 57.28 |
| 14 | 164.242 | 4.08 | 1.92250 | 36.0 | 54.36 |
| 15 | −794.404 | (Variable) | | | 53.85 |
| 16* | 43.076 | 0.92 | 1.69680 | 56.5 | 35.94 |
| 17 | 22.929 | 11.23 | | | 32.10 |
| 18 | −36.942 | 0.70 | 1.43425 | 95.0 | 31.31 |
| 19 | 64.056 | 1.53 | | | 30.56 |
| 20 | 66.757 | 0.70 | 1.89286 | 20.4 | 31.45 |
| 21 | 25.949 | 6.67 | 2.00069 | 25.5 | 31.94 |
| 22 | 374.128 | (Variable) | | | 31.98 |
| 23 | −44.872 | 0.70 | 2.00069 | 25.5 | 32.62 |
| 24 | 387.544 | 5.39 | 1.89286 | 20.4 | 34.49 |
| 25 | −54.171 | (Variable) | | | 35.46 |
| 26 (Stop) | ∞ | 1.01 | | | 37.77 |
| 27* | 35.353 | 7.84 | 1.88100 | 40.1 | 39.81 |
| 28 | −5,320.728 | 0.50 | | | 39.00 |
| 29 | 50.090 | 7.18 | 1.43385 | 95.2 | 36.64 |
| 30 | −68.081 | 1.27 | 1.74100 | 52.6 | 35.88 |
| 31 | 32.944 | 0.50 | | | 32.95 |
| 32 | 28.607 | 7.85 | 1.43385 | 95.2 | 33.25 |
| 33 | −267.543 | 0.50 | | | 32.69 |
| 34 | 31.451 | 0.73 | 2.00069 | 25.5 | 30.41 |
| 35 | 16.923 | 8.94 | 1.43385 | 95.2 | 27.45 |
| 36 | 1,099.041 | 21.07 | | | 27.14 |
| 37 | −23.865 | 1.33 | 1.95250 | 20.4 | 23.27 |
| 38 | 25.045 | 6.36 | 1.92250 | 36.0 | 26.76 |
| 39 | −71.281 | 0.50 | | | 27.30 |
| 40 | 54.202 | 3.00 | 1.98612 | 16.5 | 29.28 |
| 41 | 25,737.383 | (Variable) | | | 29.25 |
| Image plane | ∞ | | | | |

Aspherical surface data

First surface

K = 0.00000e+000   A4 = 1.17132e−007   A6 = 2.00609e−010   A8 = −6.34260e−014
A10 = −8.77421e−016   A12 = 1.07022e−018   A14 = −4.07739e−022

Eighth surface

K = 0.00000e+000   A4 = 2.33637e−007   A6 = −3.50920e−010   A8 = 4.91678e−013
A10 = −1.87914e−015   A12 = 2.11185e−018   A14 = −7.95735e−022

Sixteenth surface

K = 0.00000e+000   A4 = 1.52337e−006   A6 = 3.92617e−010   A8 = −6.66930e−012
A10 = 4.08911e−014   A12 = −1.32108e−016   A14 = 1.39906e−019

Twenty-seventh surface

K = 0.00000e+000   A4 = −1.85005e−006   A6 = −5.64411e−010   A8 = −7.60025e−013
A10 = 3.22096e−016   A12 = −2.93840e−019

Various data
Zoom ratio 2.97

| | Wide angle | Intermediate | Telephoto |
|---|---|---|---|
| Focal length | 18.51 | 34.71 | 55.00 |
| F-number | 2.06 | 2.06 | 2.06 |
| Half angle of view | 37.10 | 21.97 | 14.28 |
| Image height | 14.00 | 14.00 | 14.00 |

-continued

| Unit: mm | | | |
|---|---|---|---|
| Total lens length | 250.01 | 250.01 | 250.01 |
| BF | 12.95 | 12.95 | 12.95 |
| d15 | 1.00 | 37.03 | 56.44 |
| d22 | 40.64 | 6.22 | 8.35 |
| d25 | 27.91 | 26.29 | 4.76 |
| d41 | 12.95 | 12.95 | 12.95 |
| Entrance pupil position | 41.66 | 60.73 | 77.55 |
| Exit pupil position | −53.90 | −53.90 | −53.90 |
| Front principal point position | 55.04 | 77.41 | 87.29 |
| Rear principal point position | −5.56 | −21.76 | −42.05 |

Zoom lens unit data

| Unit | First surface | Focal length | Lens structure length | Front principal point position | Rear principal point position |
|---|---|---|---|---|---|
| 1 | 1 | 70.48 | 71.09 | 62.47 | 66.17 |
| 2 | 16 | −57.56 | 21.74 | 2.07 | −15.47 |
| 3 | 23 | −203.62 | 6.09 | −10.71 | −14.68 |
| 4 | 26 | 45.37 | 68.59 | −6.37 | −59.48 |

Numerical Embodiment 2

Unit: mm

Surface data

| Surface number | r | d | nd | vd | Effective diameter |
|---|---|---|---|---|---|
| 1* | 79.925 | 3.00 | 2.00069 | 25.5 | 58.64 |
| 2 | 29.412 | 17.71 | | | 47.19 |
| 3 | −59.718 | 2.00 | 1.81600 | 46.6 | 46.95 |
| 4 | −1,969.801 | 0.05 | | | 48.65 |
| 5 | 70.018 | 4.37 | 1.95906 | 17.5 | 50.89 |
| 6 | 162.941 | 3.00 | | | 50.63 |
| 7 | 81.749 | 9.42 | 1.43875 | 94.9 | 50.52 |
| 8* | −94.240 | 4.33 | | | 50.25 |
| 9 | 361.439 | 1.47 | 1.85896 | 22.7 | 49.25 |
| 10 | 38.251 | 12.96 | 1.49700 | 81.5 | 48.08 |
| 11 | −128.293 | 0.08 | | | 48.59 |
| 12 | 85.150 | 6.95 | 2.00330 | 28.3 | 49.63 |
| 13 | −177.689 | (Variable) | | | 49.29 |
| 14 | −354.221 | 3.00 | 1.43875 | 94.9 | 39.53 |
| 15 | −89.785 | (Variable) | | | 39.20 |
| 16* | 48.235 | 0.92 | 1.81600 | 46.6 | 28.03 |
| 17 | 18.543 | 8.95 | | | 24.32 |
| 18 | −23.391 | 0.70 | 1.53775 | 74.7 | 23.43 |
| 19 | 376.255 | 2.00 | | | 23.50 |
| 20 | 127.613 | 0.70 | 1.89286 | 20.4 | 23.65 |
| 21 | 22.214 | 6.02 | 1.96300 | 24.1 | 24.19 |
| 22 | −87.849 | (Variable) | | | 24.46 |
| 23 | −26.041 | 0.70 | 1.91650 | 31.6 | 24.66 |
| 24 | −103.989 | 3.00 | 1.92286 | 18.9 | 26.23 |
| 25 | −40.380 | (Variable) | | | 27.02 |
| 26 (Stop) | ∞ | 1.01 | | | 28.75 |
| 27* | 101.959 | 3.71 | 1.88300 | 40.8 | 30.26 |
| 28 | −106.955 | 0.13 | | | 30.60 |
| 29 | 24.993 | 9.61 | 1.51823 | 58.9 | 31.76 |
| 30 | −44.748 | 1.27 | 1.81600 | 46.6 | 31.29 |
| 31 | 117.140 | 0.50 | | | 30.18 |
| 32 | 28.565 | 7.50 | 1.43875 | 94.9 | 29.49 |
| 33 | −78.395 | 0.50 | | | 28.49 |
| 34 | 28.973 | 0.73 | 1.91650 | 31.6 | 24.26 |
| 35 | 13.884 | 6.10 | 1.43875 | 94.9 | 21.37 |
| 36 | 85.117 | 4.50 | | | 20.41 |
| 37 | −37.241 | 4.47 | 1.43875 | 94.9 | 18.47 |

-continued

Unit: mm

| | | | | | |
|---|---|---|---|---|---|
| 38 | −13.384 | 1.33 | 2.00330 | 28.3 | 17.80 |
| 39 | 79.484 | 1.00 | | | 19.34 |
| 40 | 68.068 | 1.20 | 1.95906 | 17.5 | 20.42 |
| 41 | 29.684 | 5.06 | 1.43875 | 94.9 | 21.06 |
| 42 | −31.345 | 0.50 | | | 21.89 |
| 43 | 96.098 | 3.00 | 1.95906 | 17.5 | 24.15 |
| 44 | −93.862 | (Variable) | | | 24.45 |
| Image plane | ∞ | | | | |

Aspherical surface data

First surface

K = 0.00000e+000  A4 = −6.41202e−008  A6 = 1.06448e−009  A8 = 5.16489e−013
A10 = −8.76369e−015  A12 = 1.77536e−017  A14 = −1.54399e−020  A16 = 5.09673e−024

Eighth surface

K = 0.00000e+000  A4 = 9.73656e−007  A6 = 3.11807e−010  A8 = −9.73514e−013
A10 = −1.62248e−015  A12 = 3.53177e−018  A14 = −1.79583e−021  A16 = 4.47895e−026

Sixteenth surface

K = 0.00000e+000  A4 = 3.10009e−006  A6 = −9.25439e−009  A8 = 5.09765e−011
A10 = −2.73174e−013  A12 = 4.24813e−016

Twenty-seventh surface

K = 0.00000e+000  A4 = −7.05661e−007  A6 = 5.35314e−010  A8 = −5.54070e−012
A10 = 1.51605e−014  A12 = −2.09656e−017

Various data
Zoom ratio 4.12

| | Wide angle | Intermediate | Telephoto |
|---|---|---|---|
| Focal length | 16.51 | 36.08 | 68.00 |
| F-number | 2.80 | 2.80 | 2.80 |
| Half angle of view | 40.30 | 21.21 | 11.63 |
| Image height | 14.00 | 14.00 | 14.00 |
| Total lens length | 223.02 | 223.02 | 223.02 |
| BF | 24.40 | 24.40 | 24.40 |
| d13 | 1.00 | 14.48 | 21.75 |
| d15 | 1.00 | 17.80 | 26.84 |
| d22 | 33.64 | 6.01 | 5.56 |
| d25 | 19.51 | 16.85 | 1.00 |
| d44 | 24.40 | 24.40 | 24.40 |
| Entrance pupil position | 36.50 | 56.90 | 78.20 |
| Exit pupil position | −34.77 | −34.77 | −34.77 |
| Front principal point position | 48.41 | 70.98 | 68.06 |
| Rear principal point position | 7.90 | −11.68 | −43.59 |

Zoom lens unit data

| Unit | First surface | Focal length | Lens structure length | Front principal point position | Rear principal point position |
|---|---|---|---|---|---|
| 1 | 1 | 60.47 | 65.33 | 54.71 | 54.78 |
| 2 | 14 | 273.17 | 3.00 | 2.78 | 0.71 |
| 3 | 16 | −38.17 | 19.30 | −2.07 | −19.78 |
| 4 | 23 | −92.16 | 3.70 | −4.05 | −6.25 |
| 5 | 26 | 33.69 | 52.14 | −10.78 | −42.93 |

Numerical Embodiment 3

| | | Unit: mm | | | |
|---|---|---|---|---|---|
| | | Surface data | | | |
| Surface number | r | d | nd | vd | Effective diameter |
| 1* | 93.101 | 3.00 | 2.00100 | 29.1 | 57.25 |
| 2 | 32.260 | 16.93 | | | 47.66 |
| 3 | −55.155 | 2.00 | 1.69680 | 56.5 | 47.40 |
| 4 | −15,122.578 | 0.08 | | | 49.18 |
| 5 | 70.580 | 3.90 | 1.76182 | 26.5 | 51.23 |
| 6 | 134.561 | 2.00 | | | 51.06 |
| 7 | 205.012 | 7.15 | 1.43875 | 94.9 | 51.17 |
| 8* | −85.702 | 5.05 | | | 51.15 |
| 9 | 73.216 | 1.47 | 1.93260 | 27.9 | 52.04 |
| 10 | 42.477 | 10.90 | 1.43385 | 95.2 | 50.41 |
| 11 | −293.664 | 0.08 | | | 50.49 |
| 12 | 416.378 | 4.03 | 1.69400 | 56.3 | 50.49 |
| 13 | −181.736 | 1.00 | | | 50.42 |
| 14 | 101.363 | 5.91 | 1.81600 | 46.7 | 48.78 |
| 15 | −188.758 | (Variable) | | | 48.26 |
| 16* | 43.942 | 0.92 | 1.69680 | 56.1 | 31.74 |
| 17 | 20.682 | 8.73 | | | 27.94 |
| 18 | −35.028 | 0.70 | 1.45600 | 90.9 | 27.58 |
| 19 | 50.320 | (Variable) | | | 27.64 |
| 20 | 56.865 | 0.70 | 1.85896 | 22.7 | 30.32 |
| 21 | 26.177 | 6.07 | 2.00100 | 29.1 | 30.77 |
| 22 | 274.056 | (Variable) | | | 30.78 |
| 23 | −60.110 | 0.70 | 2.00100 | 29.1 | 32.81 |
| 24 | 90.823 | 5.21 | 1.85896 | 22.7 | 34.40 |
| 25 | −77.459 | (Variable) | | | 35.04 |
| 26 (Stop) | ∞ | 1.01 | | | 36.25 |
| 27* | 36.170 | 6.46 | 1.88300 | 40.8 | 38.45 |
| 28 | 871.057 | 0.50 | | | 37.96 |
| 29 | 56.748 | 7.13 | 1.69895 | 30.1 | 36.05 |
| 30 | −52.463 | 1.27 | 1.91100 | 35.2 | 35.34 |
| 31 | 38.232 | 0.50 | | | 32.08 |
| 32 | 28.563 | 7.17 | 1.43385 | 95.2 | 32.74 |
| 33 | −156.554 | 0.50 | | | 32.49 |
| 34 | 34.747 | 0.73 | 2.00069 | 25.5 | 30.51 |
| 35 | 18.125 | 9.31 | 1.43385 | 95.2 | 27.93 |
| 36 | −113.085 | 21.13 | | | 27.70 |
| 37 | −21.256 | 1.33 | 2.00520 | 21.0 | 22.32 |
| 38 | 22.694 | 6.70 | 2.00100 | 29.1 | 26.36 |
| 39 | −71.707 | 0.50 | | | 26.92 |
| 40 | 53.744 | 3.00 | 2.00272 | 19.3 | 29.02 |
| 41 | 46,925.727 | (Variable) | | | 29.00 |
| Image plane | ∞ | | | | |

Aspherical surface data

First surface

K = 0.00000e+000  A4 = 4.99543e−007  A6 = −4.23132e−010  A8 = 1.74537e−012
A10 = −4.14940e−015  A12 = 4.33495e−018  A14 = −1.70597e−021

Eighth surface

K = 0.00000e+000  A4 = 6.12291e−007  A6 = −7.29258e−010  A8 = 1.92195e−012
A10 = −5.16966e−015  A12 = 6.04230e−018  A14 = −2.69169e−021

Sixteenth surface

K = 0.00000e+000  A4 = 1.45780e−006  A6 = −4.10566e−009  A8 = 2.36909e−011
A10 = −8.73777e−014  A12 = 3.20798e−017  A14 = 1.79913e−019

Twenty-seventh surface

K = 0.00000e+000  A4 = −2.33722e−006  A6 = −5.66701e−010  A8 = 8.46314e−014
A10 = −3.19509e−015  A12 = 3.87617e−018

Various data
Zoom ratio 2.63

| | Wide angle | Intermediate | Telephoto |
|---|---|---|---|
| Focal length | 19.01 | 33.19 | 50.00 |
| F-number | 2.05 | 2.06 | 2.06 |
| Half angle of view | 36.38 | 22.87 | 15.64 |
| Image height | 14.00 | 14.00 | 14.00 |

-continued

| Unit: mm | | | |
|---|---|---|---|
| Total lens length | 225.07 | 225.07 | 225.07 |
| BF | 13.38 | 13.38 | 13.38 |
| d15 | 1.00 | 22.97 | 34.80 |
| d19 | 1.50 | 2.64 | 3.25 |
| d22 | 27.50 | 13.51 | 18.45 |
| d25 | 27.91 | 18.79 | 1.40 |
| d41 | 13.38 | 13.38 | 13.38 |
| Entrance pupil position | 38.86 | 54.26 | 68.10 |
| Exit pupil position | −48.90 | −48.90 | −48.90 |
| Front principal point position | 52.07 | 69.76 | 77.96 |
| Rear principal point position | −5.62 | −19.81 | −36.62 |

Zoom lens unit data

| Unit | First surface | Focal length | Lens structure length | Front principal point position | Rear principal point position |
|---|---|---|---|---|---|
| 1 | 1 | 52.80 | 63.50 | 49.76 | 42.97 |
| 2 | 16 | −23.28 | 10.35 | 5.39 | −3.73 |
| 3 | 20 | 58.49 | 6.77 | −0.61 | −3.97 |
| 4 | 23 | −153.71 | 5.91 | −5.29 | −8.75 |
| 5 | 26 | 40.07 | 67.25 | −6.72 | −54.65 |

Numerical Embodiment 4

| Unit: mm | | | | | |
|---|---|---|---|---|---|
| Surface data | | | | | |
| Surface number | r | d | nd | vd | Effective diameter |
| 1* | 91.225 | 3.00 | 2.00100 | 29.1 | 57.61 |
| 2 | 33.874 | 17.11 | | | 48.40 |
| 3 | −65.901 | 2.00 | 1.78336 | 49.5 | 47.50 |
| 4 | 1,279.115 | 0.08 | | | 48.47 |
| 5 | 71.033 | 4.03 | 1.85896 | 22.7 | 52.06 |
| 6 | 134.669 | 2.00 | | | 52.12 |
| 7 | 193.364 | 9.00 | 1.43875 | 94.9 | 52.65 |
| 8* | −80.864 | 5.05 | | | 53.20 |
| 9 | 837.363 | 1.47 | 1.70585 | 30.3 | 52.96 |
| 10 | 43.326 | 10.18 | 1.43385 | 95.2 | 52.57 |
| 11 | 945.397 | 0.08 | | | 52.99 |
| 12 | 102.305 | 7.29 | 1.81600 | 46.6 | 54.34 |
| 13 | −175.018 | 1.00 | | | 54.28 |
| 14 | 189.340 | 4.67 | 1.88300 | 40.8 | 52.62 |
| 15 | −233.855 | (Variable) | | | 52.19 |
| 16* | 53.989 | 0.92 | 1.75501 | 51.2 | 31.79 |
| 17 | 24.603 | 7.26 | | | 28.80 |
| 18 | −48.174 | 0.70 | 1.48563 | 85.2 | 28.53 |
| 19 | 63.720 | 1.50 | | | 28.06 |
| 20 | 70.249 | 0.70 | 1.90680 | 21.2 | 29.06 |
| 21 | 23.325 | 6.40 | 2.00294 | 23.5 | 29.63 |
| 22 | 251.391 | (Variable) | | | 29.70 |
| 23 | −31.606 | 0.70 | 1.96300 | 24.1 | 29.94 |
| 24 | −158.404 | 4.06 | 1.92286 | 18.9 | 32.17 |
| 25 | −41.584 | (Variable) | | | 33.08 |
| 26 | 102.477 | 5.00 | 1.43875 | 95.0 | 35.51 |
| 27 | −114.788 | (Variable) | | | 35.85 |
| 28 (Stop) | ∞ | 1.01 | | | 36.09 |
| 29* | 34.513 | 6.26 | 1.88300 | 40.8 | 36.71 |
| 30 | 198.885 | 0.50 | | | 35.77 |
| 31 | 74.529 | 6.18 | 1.59551 | 38.8 | 34.84 |
| 32 | −50.300 | 1.27 | 1.74597 | 40.0 | 34.35 |
| 33 | 33.274 | 0.50 | | | 31.57 |
| 34 | 28.557 | 7.52 | 1.43385 | 95.2 | 31.85 |
| 35 | −189.712 | 0.50 | | | 31.32 |

-continued

Unit: mm

| | | | | | |
|---|---|---|---|---|---|
| 36 | 31.434 | 0.73 | 2.00540 | 27.7 | 29.17 |
| 37 | 16.871 | 8.06 | 1.43385 | 95.2 | 26.51 |
| 38 | 232.052 | 19.58 | | | 26.17 |
| 39 | −24.921 | 1.33 | 1.90200 | 25.1 | 22.95 |
| 40 | 25.263 | 6.79 | 1.78336 | 49.5 | 25.88 |
| 41 | −60.026 | 0.50 | | | 26.75 |
| 42 | 39.856 | 3.00 | 2.00170 | 20.6 | 29.39 |
| 43 | 134.596 | (Variable) | | | 29.25 |
| Image plane | ∞ | | | | |

Aspherical surface data

First surface

K = 0.00000e+000  A4 = 1.94842e−007  A6 = 1.79495e−010  A8 = 1.40309e−013
A10 = −1.31940e−015  A12 = 1.53661e−018  A14 = −6.12614e−022

Eighth surface

K = 0.00000e+000  A4 = 2.68033e−007  A6 = −1.86648e−010  A8 = −6.25948e−014
A10 = −1.06655e−015  A12 = 1.62179e−018  A14 = −7.86757e−022

Sixteenth surface

K = 0.00000e+000  A4 = 3.55414e−007  A6 = −2.33358e−009  A8 = 4.31894e−012
A10 = 2.86808e−014  A12 = −2.54131e−016  A14 = 4.54673e−019

Twenty-ninth surface

K = 0.00000e+000  A4 = −1.37368e−006  A6 = −2.49902e−010  A8 = −1.28552e−012
A10 = 4.37565e−017  A12 = 2.31111e−018

Various data
Zoom ratio 2.97

| | Wide angle | Intermediate | Telephoto |
|---|---|---|---|
| Focal length | 18.51 | 34.86 | 55.00 |
| F-number | 2.06 | 2.06 | 2.06 |
| Half angle of view | 37.10 | 21.88 | 14.28 |
| Image height | 14.00 | 14.00 | 14.00 |
| Total lens length | 235.03 | 235.03 | 235.03 |
| BF | 12.94 | 12.94 | 12.94 |
| d15 | 1.00 | 37.24 | 56.75 |
| d22 | 31.61 | 6.70 | 5.42 |
| d25 | 10.14 | 12.08 | 1.00 |
| d27 | 21.42 | 8.15 | 1.00 |
| d43 | 12.94 | 12.94 | 12.94 |
| Entrance pupil position | 39.49 | 59.80 | 77.03 |
| Exit pupil position | −51.30 | −51.30 | −51.30 |
| Front principal point position | 52.66 | 75.75 | 84.95 |
| Rear principal point position | −5.57 | −21.91 | −42.05 |

Zoom lens unit data

| Unit | First surface | Focal length | Lens structure length | Front principal point position | Rear principal point position |
|---|---|---|---|---|---|
| 1 | 1 | 70.52 | 66.95 | 60.07 | 60.78 |
| 2 | 16 | −47.42 | 17.47 | 1.89 | −11.33 |
| 3 | 23 | −157.20 | 4.76 | −8.63 | −11.75 |
| 4 | 26 | 124.27 | 5.00 | 1.65 | −1.85 |
| 5 | 28 | 57.76 | 63.74 | −7.09 | −57.62 |

Relationships between the above-mentioned respective conditional expressions and various numerical values in Numerical Embodiments are shown in Table 1.

TABLE 1

| | Embodiment | | | |
|---|---|---|---|---|
| | 1 | 2 | 3 | 4 |
| Conditional Expression (1) | 4.488 | 2.736 | 3.836 | 2.721 |
| Conditional Expression (2) | 1.224 | 1.584 | 2.268 | 1.487 |
| Conditional Expression (3) | 0.222 | 0.209 | 0.150 | 0.237 |
| Conditional Expression (4) | 0.161 | 0.323 | 0.168 | 0.171 |
| Conditional Expression (5) | −0.596 | −0.999 | −0.698 | −0.244 |
| Conditional Expression (6) | 0.092 | 0.156 | 0.097 | 0.107 |
| Conditional Expression (7) | 0.192 | 0.604 | 0.307 | 0.215 |
| Conditional Expression (8) | 95.23 | 94.93 | 95.23 | 95.23 |
| f2n | −203.6 | −92.2 | −153.7 | −157.2 |
| fr | 45.37 | 33.69 | 40.07 | 57.76 |
| ff | 70.48 | 60.47 | 52.80 | 70.52 |
| f1n | −57.56 | −38.17 | −23.28 | −47.42 |
| m1n | 55.44 | 46.59 | 33.80 | 55.75 |
| L | 250.0 | 223.0 | 225.1 | 235.0 |
| BF | 12.95 | 24.40 | 13.38 | 12.94 |
| Lr | 80.52 | 75.53 | 79.62 | 75.66 |
| βr | −0.596 | −0.999 | −0.698 | −0.244 |
| o1r | 7.389 | 11.790 | 7.732 | 8.108 |
| frp | 40.62 | 25.83 | 36.56 | 48.61 |
| frn | −211.59 | −42.78 | −119.19 | −226.51 |
| vd | 95.23 | 94.93 | 95.23 | 95.23 |

Next, an image pickup apparatus according to at least one embodiment of the present invention using the zoom lens according to any one of the embodiments of the present invention as a photographic optical system is described with reference to FIG. 17.

Figure 17:
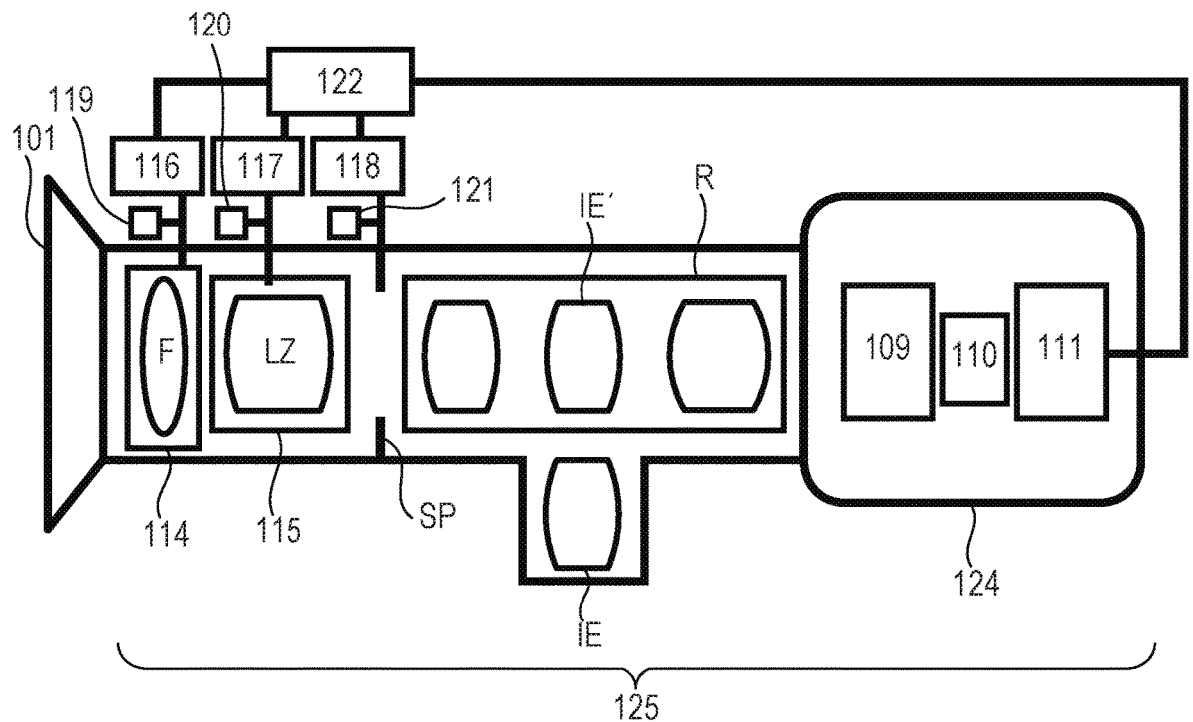
FIG. 17 is a schematic diagram of a main part of an image pickup apparatus including a zoom lens according to at least one embodiment of the present invention.

FIG. 17 is a schematic diagram of the image pickup apparatus (television camera system) using the zoom lens according to any one of Embodiments as the photographic optical system.

In FIG. 17, the zoom lens according to any one of Embodiment 1 to Embodiment 4 is denoted by 101. The camera apparatus is denoted by 124. The zoom lens 101 is detachable from the camera apparatus 124. The image pickup apparatus formed by attaching the zoom lens 101 to the camera apparatus 124 is denoted by 125. The zoom lens 101 includes a first lens unit F, a magnification-varying lens unit LZ, and an imaging lens unit R. The first lens unit F includes a focusing lens unit. The aperture stop is denoted by SP. Driving mechanisms 114 and 115, such as helicoids or cams, are configured to drive the first lens unit F and the magnification-varying lens unit LZ in the optical axis direction, respectively. Motors (driving units) 116, 117, and 118 are configured to electrically drive the driving mechanisms 114 and 115 and the aperture stop SP, respectively. Detectors 119, 120, and 121, such as encoders, potentiometers, or photosensors, are configured to detect positions on the optical axis of the first lens unit F and the magnification-varying lens unit LZ, and a stop diameter of the aperture stop SP.

In a case of a zoom lens including a movable lens unit in the lens unit R, a configuration of a driving mechanism and a detector, which is similar to the driving mechanisms and detectors 114 to 121 is added also to the lens unit R. The camera apparatus 124 includes a glass block 109 corresponding to an optical filter or a color separation optical system within the camera apparatus 124, and a solid image pickup element (photoelectric conversion element) 110, such as a CCD sensor or a CMOS sensor, which is arranged at the image plane formed by the zoom lens 101. Further, CPUs 111 and 122 are configured to control various kinds of driving of the camera apparatus 124 and the zoom lens 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-099030, filed May 28, 2019, which is hereby incorporated by reference herein in its entirety.

What is claimed is:

1. A zoom lens comprising a plurality of lens units, wherein the plurality of lens units consists of in order from an object side to an image side:
   a front lens unit having a positive refractive power and configured not to move for zooming;
   a plurality of moving lens units, including two lens units having negative refractive powers, configured to move for zooming; and
   a rear lens unit having a positive refractive power and configured not to move for zooming,
   wherein conditional expressions $2.7 < |f2n/fr| < 6.0;$ $0.5 < |ff/f1n| < 2.3;$ and $0.140 < m1n/L \leq 0.237$ are satisfied where ff is a focal length of the front lens unit, f1n is a focal length of a lens unit arranged closest to the object side of all negative lens units in the plurality of moving lens units, f2n is a focal length of a lens unit arranged closest to the image side of all negative lens units in the plurality of moving lens units, fr is a focal length of the rear lens unit, m1n is an absolute value of a maximum movement amount of the lens unit having the focal length f1n for zooming, and L is a distance from a vertex of a surface, on the object side, of a lens closest to the object side in the front lens unit to an image plane.

2. The zoom lens according to claim 1, wherein a conditional expression $-1.0 < \beta r < -0.2$ is satisfied where βr is a lateral magnification of the rear lens unit.

3. An image pickup apparatus comprising:
   a zoom lens of claim 1; and
   an image pickup element configured to pick up an image formed by the zoom lens.

4. A zoom lens comprising a plurality of lens units, wherein the plurality of lens units consists of in order from an object side to an image side:
   a front lens unit having a positive refractive power and configured not to move for zooming;
   a plurality of moving lens units, including two lens units having negative refractive powers, configured to move for zooming; and
   a rear lens unit having a positive refractive power and configured not to move for zooming, wherein conditional expressions $2.7 < |f2n/fr| < 6.0;$ $0.5 < |ff/f1n| < 2.3;$ and $0.05 < BF/Lr < 0.35$ are satisfied where ff is a focal length of the front lens unit, f1n is a focal length of a lens unit arranged closest to the object side of all negative lens units in the plurality of moving lens units, f2n is a focal length of a lens unit arranged closest to the image side of all negative lens units in the plurality of moving lens units, fr is a focal length of the rear lens unit, Lr is a distance from a vertex of a surface, on the object side, of a lens closest to the object side in the rear lens unit to an image plane, and BF is a distance from a vertex of a surface, on the image side, of a lens closest to the image side in the rear lens unit to the image plane.

5. An image pickup apparatus comprising:
a zoom lens of claim 4; and
an image pickup element configured to pick up an image formed by the zoom lens.

6. A zoom lens comprising a plurality of lens units, wherein the plurality of lens units consists of in order from an object side to an image side:
a front lens unit having a positive refractive power and configured not to move for zooming;
a plurality of moving lens units, including two lens units having negative refractive powers, configured to move for zooming; and
a rear lens unit having a positive refractive power and configured not to move for zooming,
wherein the rear lens unit has a front principal point located on the object side with respect to a vertex of a surface, on the object side, of a lens closest to the object side in the rear lens unit, and
wherein conditional expressions $2.7 < |f2n/fr| < 6.0;$ $0.5 < |ff/f1n| < 2.3;$ and $0.08 < o1r/Lr < 0.20$ are satisfied where ff is a focal length of the front lens unit, f1n is a focal length of a lens unit arranged closest to the object side of all negative lens units in the plurality of moving lens units, f2n is a focal length of a lens unit arranged closest to the image side of all negative lens units in the plurality of moving lens units, fr is a focal length of the rear lens unit, o1r is a distance from the vertex of the surface to the front principal point, and Lr is a distance from the vertex of the surface to an image plane.

7. An image pickup apparatus comprising:
a zoom lens of claim 6; and
an image pickup element configured to pick up an image formed by the zoom lens.

8. A zoom lens consisting of in order from an object side to an image side:
a front lens unit having a positive refractive power and configured not to move for zooming;
a plurality of moving lens units, including two lens units having negative refractive powers, configured to move for zooming; and
a rear lens unit having a positive refractive power and configured not to move for zooming,
wherein the rear lens unit consists of a front lens sub-unit having a positive refractive power and a rear lens sub-unit having a negative refractive power with a largest gap therebetween in the rear lens unit, and
wherein conditional expressions $2.7 < |f2n/fr| < 6.0;$ $0.5 < |ff/f1n| < 2.3;$ and $0.1 < |frp/frn| < 0.7$ are satisfied where ff is a focal length of the front lens unit, f1n is a focal length of a lens unit arranged closest to the object side of all negative lens units in the plurality of moving lens units, f2n is a focal length of a lens unit arranged closest to the image side of all negative lens units in the plurality of moving lens units, fr is a focal length of the rear lens unit, frp is a focal length of the front lens sub-unit, and frn is a focal length of the rear lens sub-unit.

9. The zoom lens according to claim 8, wherein the front lens sub-unit includes a plurality of lenses each having a positive refractive power and an Abbe number vd that satisfies a conditional expression $75.0 < vd < 100,$ where the Abbe number vd is represented by an expression $vd = (Nd - 1)/(NF - NC),$ where NF, Nd, and NC are refractive indices with respect to an F-line (wavelength of 486.1 nm), a d-line (wavelength of 587.6 nm), and a C-line (wavelength of 656.3 nm) as Fraunhofer lines, respectively.

10. An image pickup apparatus comprising:
a zoom lens of claim 8; and
an image pickup element configured to pick up an image formed by the zoom lens.

\* \* \* \* \*